US009519989B2

(12) United States Patent
Perez et al.

(10) Patent No.: US 9,519,989 B2
(45) Date of Patent: *Dec. 13, 2016

(54) VISUAL REPRESENTATION EXPRESSION BASED ON PLAYER EXPRESSION

(71) Applicant: MICROSOFT TECHNOLOGY LICENSING, LLC, Redmond, WA (US)

(72) Inventors: Kathryn Stone Perez, Shoreline, WA (US); Alex Kipman, Redmond, WA (US); Nicholas D. Burton, Hermington (GB); Andrew Wilson, Ashby de la Zouch (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

This patent is subject to a terminal disclaimer.

(21) Appl. No.: 13/784,480

(22) Filed: Mar. 4, 2013

(65) Prior Publication Data

US 2013/0187929 A1    Jul. 25, 2013

Related U.S. Application Data

(63) Continuation of application No. 12/500,251, filed on Jul. 9, 2009, now Pat. No. 8,390,680.

(51) Int. Cl.
*H04N 7/18* (2006.01)
*G06T 13/80* (2011.01)
(Continued)

(52) U.S. Cl.
CPC ............. *G06T 13/80* (2013.01); *A63F 13/213* (2014.09); *A63F 13/42* (2014.09); *G06F 3/011* (2013.01); *G06F 3/017* (2013.01)

(58) Field of Classification Search
CPC ..................................................... G06T 13/80
(Continued)

(56) References Cited

U.S. PATENT DOCUMENTS 4,627,620 A    12/1986 Yang
4,630,910 A    12/1986 Ross et al.
(Continued)

FOREIGN PATENT DOCUMENTS

CN    101254344 B    6/2010
EP    0583061 A2    2/1994
(Continued)

OTHER PUBLICATIONS

Fukui et al.; "Emotion Identification Using a Single Acceleration Sensor"; Research Report; Institute of Electronics, Information and Communication Engineers; vol. 108 No. 389; Jan. 2009; pp. 109-114; contains English Abstract.

(Continued)

*Primary Examiner* — Leron Beck
(74) *Attorney, Agent, or Firm* — Gregg Wisdom; Judy Yee; Micky Minhas

(57) ABSTRACT

Using facial recognition and gesture/body posture recognition techniques, a system can naturally convey the emotions and attitudes of a user via the user's visual representation. Techniques may comprise customizing a visual representation of a user based on detectable characteristics, deducting a user's temperament from the detectable characteristics, and applying attributes indicative of the temperament to the visual representation in real time. Techniques may also comprise processing changes to the user's characteristics in the physical space and updating the visual representation in real time. For example, the system may track a user's facial expressions and body movements to identify a temperament and then apply attributes indicative of that temperament to (Continued)

the visual representation. Thus, a visual representation of a user, which may be, for example, an avatar or fanciful character, can reflect the user's expressions and moods in real time.

20 Claims, 10 Drawing Sheets

(51) Int. Cl.
*G06F 3/01* (2006.01)
*A63F 13/213* (2014.01)
*A63F 13/42* (2014.01)

(58) Field of Classification Search
USPC .......................................................... 348/77
See application file for complete search history.

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,774,591 A | 6/1998 | Black et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,272,231 B1 | 8/2001 | Maurer et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,466,213 B2 | 10/2002 | Bickmore et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,771,277 B2 | 8/2004 | Ohba |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,151,530 B2 | 12/2006 | Roeber et al. |
| 7,170,492 B2 | 1/2007 | Bell |
| 7,184,048 B2 | 2/2007 | Hunter |

(56) References Cited

U.S. PATENT DOCUMENTS

| | | |
|---|---|---|
| 7,202,898 B1 | 4/2007 | Braun et al. |
| 7,222,078 B2 | 5/2007 | Abelow |
| 7,224,384 B1 | 5/2007 | Iddan et al. |
| 7,227,526 B2 | 6/2007 | Hildreth et al. |
| 7,259,747 B2 | 8/2007 | Bell |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,386,799 B1 | 6/2008 | Clanton et al. |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,390,680 B2 | 3/2013 | Perez et al. |
| 2004/0207597 A1 | 10/2004 | Marks |
| 2005/0059488 A1 | 3/2005 | Larsen et al. |
| 2005/0206610 A1 | 9/2005 | Cordelli |
| 2006/0188144 A1 | 8/2006 | Sasaki et al. |
| 2006/0239558 A1 | 10/2006 | Rafii et al. |
| 2007/0013718 A1 | 1/2007 | Ohba |
| 2007/0060336 A1 | 3/2007 | Marks et al. |
| 2007/0098222 A1 | 5/2007 | Porter et al. |
| 2007/0139512 A1 | 6/2007 | Hada et al. |
| 2007/0149282 A1 | 6/2007 | Lu et al. |
| 2007/0216894 A1 | 9/2007 | Garcia et al. |
| 2007/0260984 A1 | 11/2007 | Marks et al. |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0026838 A1 | 1/2008 | Dunstan et al. |
| 2008/0062257 A1 | 3/2008 | Corson |
| 2008/0100620 A1 | 5/2008 | Nagai et al. |
| 2008/0126937 A1 | 5/2008 | Pachet |
| 2008/0134102 A1 | 6/2008 | Movold et al. |
| 2008/0152191 A1 | 6/2008 | Fujimura et al. |
| 2008/0215972 A1 | 9/2008 | Zalewski et al. |
| 2008/0215973 A1 | 9/2008 | Zalewski et al. |
| 2008/0215974 A1 | 9/2008 | Harrison et al. |
| 2009/0002178 A1 | 1/2009 | Guday et al. |
| 2009/0055190 A1 | 2/2009 | Filev et al. |
| 2009/0141933 A1 | 6/2009 | Wagg |
| 2009/0167679 A1 | 7/2009 | Klier |
| 2009/0221368 A1 | 9/2009 | Yen et al. |
| 2010/0123776 A1 | 5/2010 | Wydeven et al. |
| 2010/0275141 A1* | 10/2010 | Scherpa et al. ............... 715/765 |
| 2012/0079046 A1 | 3/2012 | Murphy |

FOREIGN PATENT DOCUMENTS

| | | |
|---|---|---|
| EP | 1122687 A2 | 8/2001 |
| JP | 4-325180 A | 11/1992 |
| JP | 08044490 A | 2/1996 |
| JP | 2000-163178 A | 6/2000 |
| JP | 2002-331093 A | 11/2002 |
| JP | 2003-248841 A | 9/2003 |
| JP | 2005-352893 A | 12/2005 |
| JP | 2007-256502 A | 10/2007 |
| KR | 10-2005-0033918 A | 4/2005 |
| KR | 10-2007-0021003 A | 2/2007 |
| KR | 10-0884467 B1 | 2/2009 |
| RU | 2107328 C1 | 3/1998 |
| WO | WO 93/10708 A1 | 6/1993 |
| WO | WO 97/17598 A1 | 5/1997 |
| WO | WO 99/15863 A1 | 4/1999 |
| WO | WO 99/44698 A1 | 9/1999 |
| WO | WO 01/59975 A3 | 8/2001 |
| WO | WO 02/082249 A2 | 10/2002 |
| WO | WO 03/001722 A3 | 1/2003 |
| WO | WO 03/046706 A1 | 6/2003 |
| WO | WO 03/054683 A3 | 7/2003 |
| WO | WO 03/071410 A3 | 8/2003 |
| WO | WO 03/073359 A3 | 9/2003 |
| WO | WO 2004/086208 A2 | 10/2004 |
| WO | WO 2007/098560 | 9/2007 |
| WO | 2009/002503 A1 | 12/2008 |
| WO | WO 2009/059065 A1 | 5/2009 |

OTHER PUBLICATIONS

"Virtual High Anxiety", Tech Update, Aug. 1995, pp. 22.

Aggarwal et al., "Human Motion Analysis: A Review", IEEE Nonrigid and Articulated Motion Workshop, 1997, University of Texas at Austin, Austin, TX.

Azarbayejani et al., "Visually Controlled Graphics", Jun. 1993, vol. 15, No. 6, IEEE Transactions on Pattern Analysis and Machine Intelligence.

Breen et al., "Interactive Occlusion and Collusion of Real and Virtual Objects in Augmented Reality", Technical Report ECRC-95-02, 1995, European Computer-Industry Research Center GmbH, Munich, Germany.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

Freeman et al., "Television Control by Hand Gestures", Dec. 1994, Mitsubishi Electric Research Laboratories, TR94-24, Caimbridge, MA.

Granieri et al., "Simulating Humans in VR", The British Computer Society, Oct. 1994, Academic Press.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

He, "Generation of Human Body Models", Apr. 2005, University of Auckland, New Zealand.

(56) References Cited

OTHER PUBLICATIONS

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
Isard et al., "Condensation—Conditional Density Propagation for Visual Tracking", 1998, pp. 5-28, International Journal of Computer Vision 29(1), Netherlands.
Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.
Kohler, "Special Topics of Gesture Recognition Applied in Intelligent Home Environments", In Proceedings of the Gesture Workshop, 1998, pp. 285-296, Germany.
Kohler, "Technical Details and Ergonomical Aspects of Gesture Recognition applied in Intelligent Home Environments", 1997, Germany.
Kohler, "Vision Based Remote Control in Intelligent Home Environments", University of Erlangen-Nuremberg/Germany, 1996, pp. 147-154, Germany.
Livingston, "Vision-based Tracking with Dynamic Structured Light for Video See-through Augmented Reality", 1998, University of North Carolina at Chapel Hill, North Carolina, USA.
Miyagawa et al., "CCD-Based Range Finding Sensor", Oct. 1997, pp. 1648-1652, vol. 44 No. 10, IEEE Transactions on Electron Devices.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.
Qian et al., "A Gesture-Driven Multimodal Interactive Dance System", Jun. 2004, pp. 1579-1582, IEEE International Conference on Multimedia and Expo (ICME), Taipei, Taiwan.
Rosenhahn et al., "Automatic Human Model Generation", 2005, pp. 41-48, University of Auckland (CITR), New Zealand.
Shao et al., "An Open System Architecture for a Multimedia and Multimodal User Interface", Aug. 24, 1998, Japanese Society for Rehabilitation of Persons with Disabilities (JSRPD), Japan.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.
Zhao, "Dressed Human Modeling, Detection, and Parts Localization", 2001, The Robotics Institute, Carnegie Mellon University, Pittsburgh, PA.
Barrientos, F.; Cursive: A Novel Interaction Technique for Controlling Expressive Avatar Gesture; 2001, pp. 151-152.
Cross-Cultural Evaluations of Avatar Facial Expressions; 8 pages.
Fujita, K.; Autonomic Gaze Control of Avatars Using Voice Information in Virtual Space Voice Chat System; 5 Pages.
Kim, J. S. et al; Study on Intelligent Autonomous Navigation of Avatar using Hand Gesture Recognition; IEEE 2000, pp. 846-850.
Lee , C. et al; The Control of Avatar Motion using Hand Gesture for Immersive Virtual Environment; Jan. 13, 1999; 8 Pages.
Lee, J. et al; Interactive Controls of Avatars Animated with Human Motion Data; 10 Pages.
Qian et al., "A Gesture-Driven Multimodal Interactive Dance System", IEEE International Conference on Multimedia and Expo, Taipei, Jun. 2004, 3, 1579-1582.
Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.
PCT Application No. PCT/US2010/041097: International Search Report and Written Opinion of the International Searching Authority, Feb. 24, 2011, 8 pages.
"Simulation and Training", 1994, Division Incorporated.
European Patent Application No. 10797739.9; Supplemental Search Report; dated May 10, 2016; 4 pages.

\* cited by examiner

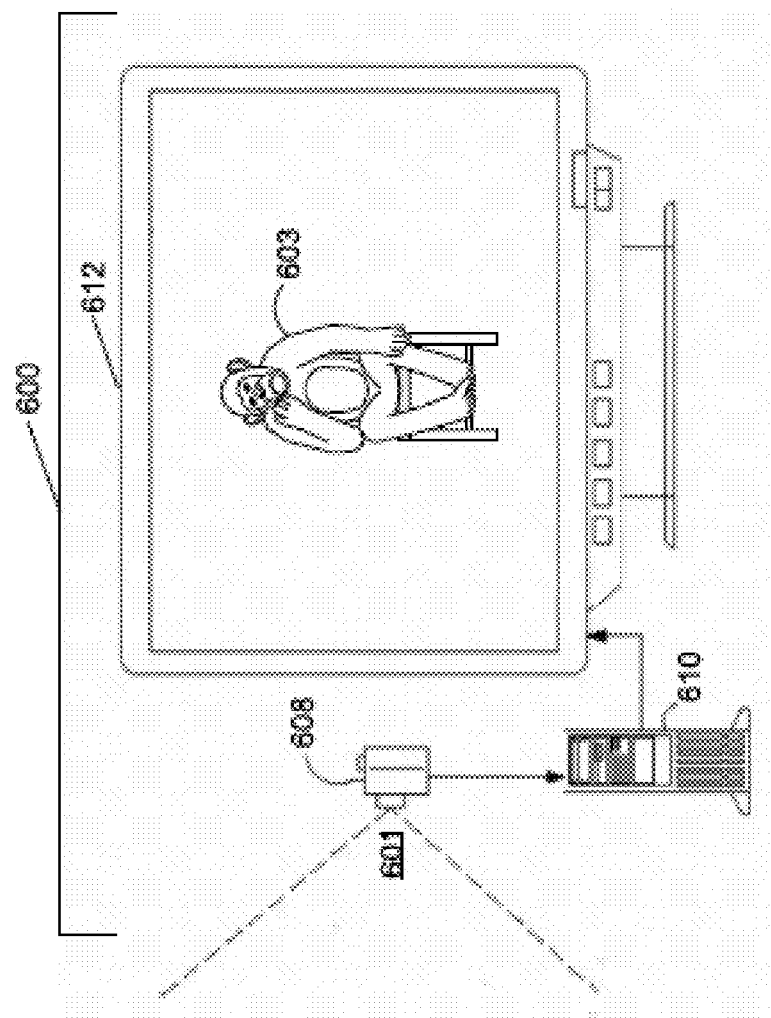
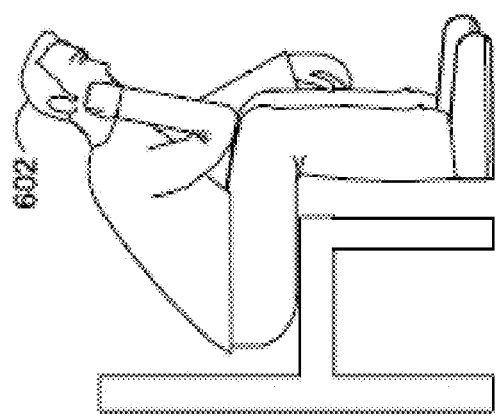
FIG. 6

| | Facial Expression | Vocal Tone | Vocal Volume | Words | Body Position | Gesture | Application Results | History Data | Temperament |
|---|---|---|---|---|---|---|---|---|---|
| A | frown | N/A | N/A | N/A | N/A | N/A | failed game results | frown is typical for user after failed results | generally negative |
| B | frown | terse | quiet | | leaning back; head dropped to one side and supported by one hand | kicking motion | failed game results | comparison of categories to specific user history data | bored, disinterested |
| C | smile | happy | loud | Yeah, Awesome! | arms raised, jumping up and down | jumping up and down | successful game results | comparison of categories to specific user history data | excited |

FIG. 8

VISUAL REPRESENTATION EXPRESSION BASED ON PLAYER EXPRESSION

CROSS REFERENCE TO RELATED APPLICATIONS

This application is a continuation of U.S. patent application Ser. No. 12/500,251 filed on Jul. 9, 2009, the entire contents are incorporated herein by reference.

BACKGROUND

Often, various applications will display a visual representation that corresponds to a user that the user controls through certain actions, such as selecting buttons on a remote or moving a controller in a certain manner. The visual representation may be in the form of an avatar, a fanciful character, a cartoon image or animal, a cursor, a hand, or the like. The visual representation is a computer representation corresponding to a user that typically takes the form of a two-dimensional (2D) or three-dimensional (3D) model in various applications, such as computer games, video games, chats, forums, communities, instant messaging services, and the like. Many computing applications such as computer games, multimedia applications, office applications, or the like provide a selection of pre-defined animated characters that may be selected for use in the application as the user's avatar. Some systems may incorporate a camera that has the ability to take a picture of a user and identify features from that frame of data. However, these systems require a capture of a user's feature, processing of the image, and then application to the character in a non-real time environment, and the features applied are low fidelity, usually based on a single snapshot of the user.

SUMMARY

It may be desirable to customize a visual representation of a user based on the detected characteristics of the user and it may be desirable to apply the characteristics to the visual representation in real time. It may also be desirable that the system processes changes to the user's characteristics in the physical space and can update the visual representation in real time. Of these characteristics, it may be desirable that the system identifies a user's temperament and applies attributes indicative of the temperament to the user's visual representation.

Disclosed herein are techniques for providing a visual representation of a user, such as an avatar or fanciful character, that can reflect the user's temperament in real time. Using facial recognition and gesture/body posture recognition techniques, the system can deduct a user's temperament. The system can naturally convey the emotions and attitudes of a user via the application of attributes of the user's temperament to the user's visual representation. Also disclosed are techniques for tracking the user in the physical space over time and applying modifications or updates to the visual representation in real time. For example, the system may track a user's facial expressions and body movements to identify a temperament and then apply attributes indicative of that temperament to the visual representation. The system may use any detectable characteristics to evaluate the user's temperament for application to the visual representation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The systems, methods, and computer readable media for modifying a visual representation in accordance with this specification are further described with reference to the accompanying drawings in which:

FIG. 6 depicts an example target recognition, analysis, and tracking system and an example embodiment of a user in the physical space and a display of the user's visual representation.

FIG. 8 depicts an example lookup table for deducing a user's temperament.

DETAILED DESCRIPTION OF ILLUSTRATIVE EMBODIMENTS

Figure 1:
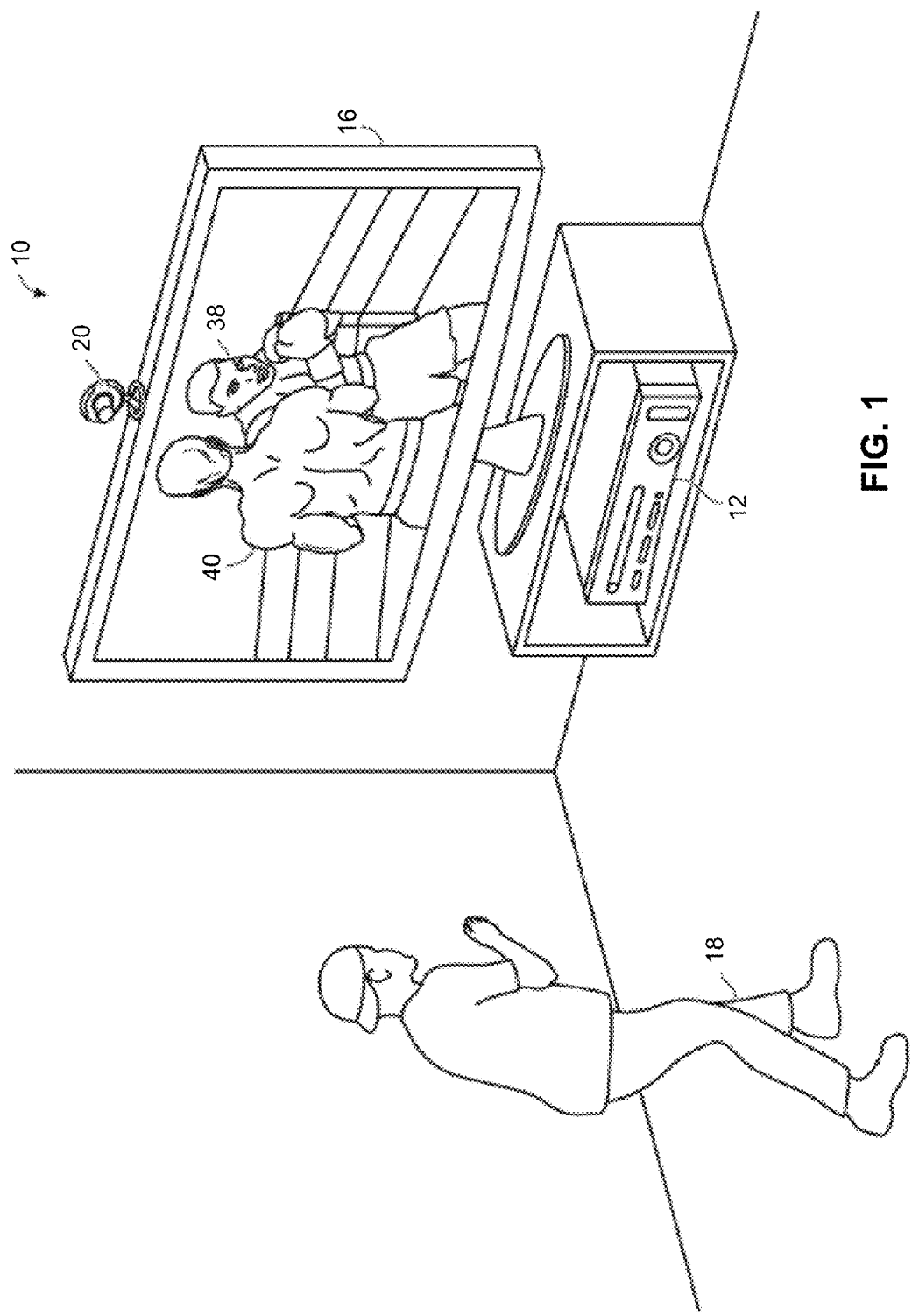
FIG. 1 illustrates an example embodiment of a target recognition, analysis, and tracking system with a user playing a game.

Disclosed herein are techniques for providing a visual representation of a user, such as an avatar, that can reflect the user's temperament. The visual representation of the user may be in the form of a character, an animation, an avatar, a cursor on the screen, a hand, or any other virtual representation that corresponds to the user in the physical space. Using facial recognition and gesture/body posture recognition techniques, a system can naturally convey the emotions and attitudes of a user via the user's visual representation. For example, a capture device may identify features of a user and customize the user's visual representation based on those identified features, such as emotions, expressions, and moods. In an example embodiment, the system generates and uses aspects of a skeletal or mesh model of a person based on the image data captured by the capture device, and uses body recognition techniques to determine the user's temperament.

Also disclosed are techniques for displaying the visual representation in real time and applying attributes indicative of a user's temperament to the visual representation in real time. The system may track the user in the physical space over time and apply modifications or updates to the visual representation in real time. The system may track detectable characteristics such as a user's characteristics, gestures, an application status, etc, to deduce a user's temperament. A user's characteristics, for example, such as facial expressions and body movements, may be used to deduce a temperament and then attributes of that temperament may be applied to the visual representation so that the visual representation reflects the user's temperament. For example, the capture device may identify behaviors and mannerisms, emotions, speech patterns, history data, or the like, of a user to determine the user's temperament and apply these to the user's visual representation. The system may use any detectable features to evaluate the user's temperament for application to the visual representation.

To generate a model representative of a target or object in a physical space, a capture device can capture a depth image of the scene and scan targets or objects in the scene. A target may be a human target, such as a user, in the physical space. Thus, as used herein, it is understood that target and user may be used interchangeably. In one embodiment, the capture device may determine whether one or more targets or objects in the scene correspond to a human target such as the user. To determine whether a target or object in the scene corresponds to a human target, each of the targets may be flood filled and compared to a pattern of a human body model. Each target or object that matches the human body model may then be scanned to generate a skeletal model associated therewith. For example, a target identified as a human may be scanned to generate a skeletal model associated therewith. The skeletal model may then be provided to the computing environment for tracking the skeletal model and rendering a visual representation associated with the skeletal model. The computing environment may determine which controls to perform in an application executing on the computer environment based on, for example, gestures of the user that have been recognized and mapped to the skeletal model. Thus, user feedback may be displayed, such as via an avatar on a screen, and the user can control that avatar's motion by making gestures in the physical space.

The motion of the visual representation can be controlled by mapping the movement of the visual representation to the motion of the user in the physical space. For example, the target may be a human user that is motioning or gesturing in the physical space. The visual representation of the target may be an avatar displayed on a screen, and the avatar's motion may correspond to the user's motion. Motion in the physical space may be translated to a control in a system or application space, such as a virtual space and/or a game space. For example, a user's motions may be tracked, modeled, and displayed, and the user's gestures may control certain aspects of an operating system or executing application. The user's gestures may be translated to a control in the system or application space for applying attributes indicative of a temperament to a visual representation.

Captured motion may be any motion in the physical space that is captured by the capture device, such as a camera. The captured motion could include the motion of a target in the physical space, such as a user or an object. The captured motion may include a gesture that translates to a control in an operating system or application. The motion may be dynamic, such as a running motion, or the motion may be static, such as a user that is posed with little movement.

The system, methods, and components of facial and body recognition for conveying a user's attitudes and emotions described herein may be embodied in a multi-media console, such as a gaming console, or in any other computing device in which it is desired to display a visual representation of a target, including, by way of example and without any intended limitation, satellite receivers, set top boxes, arcade games, personal computers (PCs), portable telephones, personal digital assistants (PDAs), and other hand-held devices.

FIG. 1 illustrates an example embodiment of a configuration of a target recognition, analysis, and tracking system 10 that may employ techniques for applying characteristics of the user to a visual representation. In the example embodiment, a user 18 is playing a boxing game. In an example embodiment, the tracking system 10 may recognize, analyze, and/or track a human target such as the user 18. The tracking system 10 may gather information related to the user's motions, facial expressions, body language, emotions, etc, in the physical space. For example, the system may identify and scan the human target 18. The tracking system 10 may use body posture recognition techniques to identify the temperament of the human target 18. For example, if the user 18 slouches, folds his hands over his chest, and motions his head to the side with lethargic motion, the tracking system 10 may identify the body parts of the user 18 and how they move. The tracking system 10 may compare the motions to a library of emotions, moods, attitudes, expressions, etc, to interpret the temperament of the user.

As shown in FIG. 1, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like.

As shown in FIG. 1, the target recognition, analysis, and tracking system 10 may further include a capture device 20. The capture device 20 may be, for example, a camera that may be used to visually monitor one or more users, such as the user 18, such that gestures performed by the one or more users may be captured, analyzed, and tracked to perform one or more controls or actions within an application, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIG. 1, the target recognition, analysis, and tracking system 10 may be used to recognize, analyze, and/or track a human target such as the user 18. For example, the user 18 may be tracked using the capture device 20 such that the movements of user 18 may be interpreted as controls that may be used to affect the application being executed by computing environment 12. Thus, according to one embodiment, the user 18 may move his or her body to control the application. The system 10 may track the user's body and the motions made by the user's body, including gestures that control aspects of the system, such as the application, operating system, or the like. The system may compare the user's body posture, facial expressions, vocal expressions and tone, directed gazes, etc, to determine a user's temperament or attitude and apply characteristics of that temperament or attitude to the avatar.

The system 10 may translate an input to a capture device 20 into an animation, the input being representative of a user's motion, such that the animation is driven by that input. Thus, the user's motions may map to a visual representation such that the user's motions in the physical space are performed by the avatar 40. The user's motions may be gestures that are applicable to a control in an application. As shown in FIG. 1, in an example embodiment, the application executing on the computing environment 12 may be a boxing game that the user 18 may be playing.

The computing environment 12 may use the audiovisual device 16 to provide a visual representation of a player avatar 40 that the user 18 may control with his or her movements. For example, the user 18 may throw a punch in physical space to cause the player avatar 40 to throw a punch in game space. The player avatar 40 may have the characteristics of the user identified by the capture device 20, or the system 10 may use the features of a well-known boxer or portray the physique of a professional boxer for the visual representation that maps to the user's motions. The system 10 may track the user and modify characteristics of the user's avatar based on detectable features of the user in the physical space. The computing environment 12 may also use the audiovisual device 16 to provide a visual representation of a boxing opponent 38 to the user 18. According to an example embodiment, the computing environment 12 and the capture device 20 of the target recognition, analysis, and tracking system 10 may be used to recognize and analyze the punch of the user 18 in the physical space such that the punch may be interpreted as a game control of the player avatar 40 in game space. Multiple users can interact with each other from remote locations. For example, the visual representation of the boxing opponent 38 may be representative of another user, such as a second user in the physical space with user 18 or a networked user in a second physical space.

Other movements by the user 18 may also be interpreted as other controls or actions, such as controls to bob, weave, shuffle, block, jab, or throw a variety of different power punches. Furthermore, some movements may be interpreted as controls that may correspond to actions other than controlling the player avatar 40. For example, the player may use movements to end, pause, or save a game, select a level, view high scores, communicate with a friend, etc. Additionally, a full range of motion of the user 18 may be available, used, and analyzed in any suitable manner to interact with an application.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

A user's gestures or motion may be interpreted as controls that may correspond to actions other than controlling the player avatar 40. For example, the player may use movements to end, pause, or save a game, select a level, view high scores, communicate with a friend, etc. The player may use movements to apply attributes indicative of a temperament to the user's visual representation. Virtually any controllable aspect of an operating system and/or application may be controlled by movements of the target such as the user 18. According to other example embodiments, the target recognition, analysis, and tracking system 10 may interpret target movements for controlling aspects of an operating system and/or application that are outside the realm of games.

An application of a user's feature to a visual representation or the detection of certain emotions or attitudes of the user may be an aspect of the operating system and/or application that can be controlled by or recognized from the user's gestures. For example, a gesture for a user's hands folded across his or her chest may be a gesture recognized as a mood of frustration. The system's recognition of a gesture that indicates the user is frustrated, along with a user's expression, such as a frown, may result in a visual representation that reflects a frustrated temperament.

The user's gesture may be controls applicable to an operating system, non-gaming aspects of a game, or a non-gaming application. The user's gestures may be interpreted as object manipulation, such as controlling a user interface. For example, consider a user interface having blades or a tabbed interface lined up vertically left to right, where the selection of each blade or tab opens up the options for various controls within the application or the system. The system may identify the user's hand gesture for movement of a tab, where the user's hand in the physical space is virtually aligned with a tab in the application space. The gesture, including a pause, a grabbing motion, and then a sweep of the hand to the left, may be interpreted as the selection of a tab, and then moving it out of the way to open the next tab.

Figure 2:
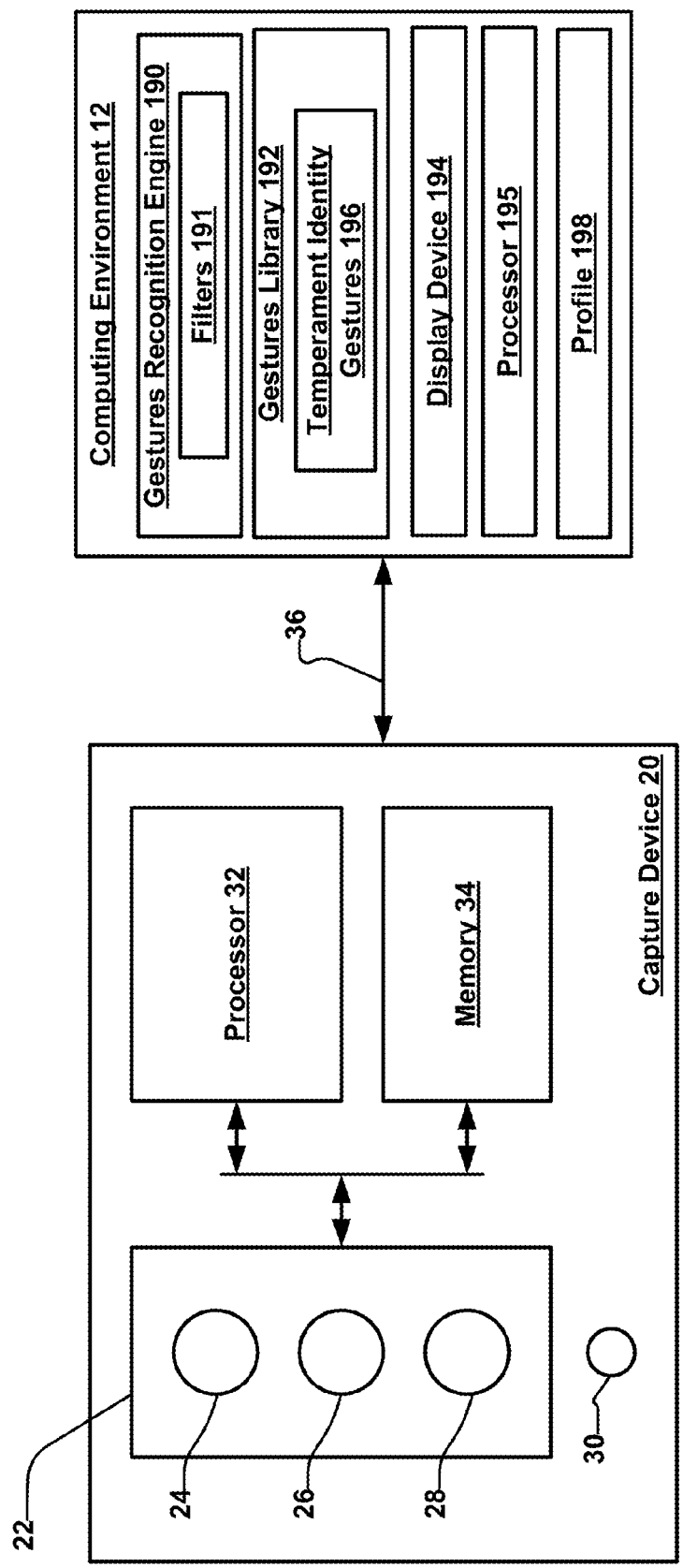
FIG. 2 illustrates an example embodiment of a capture device that may be used in a target recognition, analysis, and tracking system and incorporate chaining and animation blending techniques.

FIG. 2 illustrates an example embodiment of a capture device 20 that may be used for target recognition, analysis, and tracking, where the target can be a user or an object. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 20 to a particular location on the targets or objects.

According to another embodiment, the capture device 20 may include two or more physically separated cameras that may view a scene from different angles, to obtain visual stereo data that may be resolved to generate depth information The capture device 20 may further include a microphone 30, or an array of microphones. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3D camera 26 or RGB camera 28, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. The computing environment 12 may then use the skeletal model, depth information, and captured images to, for example, control an application such as a game or word processor. For example, as shown, in FIG. 2, the computing environment 12 may include a gestures library 192.

As shown, in FIG. 2, the computing environment 12 may include a gestures library 192 and a Gestures Recognition Engine 190. The Gestures Recognition Engine 190 may include a collection of gesture filters 191. A filter may comprise code and associated data that can recognize gestures or otherwise process depth, RGB, or skeletal data. Each filter 191 may comprise information defining a gesture along with parameters, or metadata, for that gesture. For instance, a throw, which comprises motion of one of the hands from behind the rear of the body to past the front of the body, may be implemented as a gesture filter 191 comprising information representing the movement of one of the hands of the user from behind the rear of the body to past the front of the body, as that movement would be captured by a depth camera. Parameters may then be set for that gesture. Where the gesture is a throw, a parameter may be a threshold velocity that the hand has to reach, a distance the hand must travel (either absolute, or relative to the size of the user as a whole), and a confidence rating by the Gestures Recognition Engine 190 that the gesture occurred. These parameters for the gesture may vary between applications, between contexts of a single application, or within one context of one application over time.

While it is contemplated that the Gestures Recognition Engine 190 may include a collection of gesture filters, where a filter may comprise code or otherwise represent a component for processing depth, RGB, or skeletal data, the use of a filter is not intended to limit the analysis to a filter. The filter is a representation of an example component or section of code that analyzes data of a scene received by a system, and comparing that data to base information that represents a gesture. As a result of the analysis, the system may produce an output corresponding to whether the input data corresponds to the gesture. The base information representing the gesture may be adjusted to correspond to the recurring feature in the history of data representative of the user's capture motion. The base information, for example, may be part of a gesture filter as described above. But, any suitable manner for analyzing the input data and gesture data is contemplated.

A gesture may be recognized as a temperament identity gesture. In an example embodiment, the motion in the physical space may be representative of a gesture recognized as a request to apply attributes of a particular temperament to the visual representation of a target. A plurality of gestures may each represent a particular temperament identity gesture. Thus, a user can control the form of the visual representation by making a gesture in the physical space that is recognized as a temperament identity gesture. For example, as described above, the user's motion may be compared to a gesture filter, such as gesture filter 191 from FIG. 2. The gesture filter 191 may comprise information for a temperament identity gesture from the temperament identity gestures 196 in the gestures library 192.

A plurality of temperament identity gestures may each represent a temperament having attributes to be applied to a visual representation on the screen. For example, an "excited" identify gesture may be recognized from the identity of a user's motion comprising a jumping up and down motion with the user's arms raised in the air. The result may be the application of attributes, directly mapped to the user's motion and/or animations in addition to the user's motion, to the user's visual representation.

The data captured by the cameras 26, 28 and device 20 in the form of the skeletal model and movements associated with it may be compared to the gesture filters 191 in the gesture library 192 to identify when a user (as represented by the skeletal model) has performed one or more gestures. Thus, inputs to a filter such as filter 191 may comprise things such as joint data about a user's joint position, like angles formed by the bones that meet at the joint, RGB color data from the scene, and the rate of change of an aspect of the user. As mentioned, parameters may be set for the gesture. Outputs from a filter 191 may comprise things such as the confidence that a given gesture is being made, the speed at which a gesture motion is made, and a time at which the gesture occurs.

The computing environment 12 may include a processor 195 that can process the depth image to determine what targets are in a scene, such as a user 18 or an object in the room. This can be done, for instance, by grouping together of pixels of the depth image that share a similar distance value. The image may also be parsed to produce a skeletal representation of the user, where features, such as joints and tissues that run between joints are identified. There exist skeletal mapping techniques to capture a person with a depth camera and from that determine various spots on that user's skeleton, joints of the hand, wrists, elbows, knees, nose, ankles, shoulders, and where the pelvis meets the spine. Other techniques include transforming the image into a body model representation of the person and transforming the image into a mesh model representation of the person.

In an embodiment, the processing is performed on the capture device 20 itself, and the raw image data of depth and color (where the capture device 20 comprises a 3D camera 26) values are transmitted to the computing environment 12 via link 36. In another embodiment, the processing is performed by a processor 32 coupled to the camera and then the parsed image data is sent to the computing environment 12. In still another embodiment, both the raw image data and the parsed image data are sent to the computing environment 12. The computing environment 12 may receive the parsed image data but it may still receive the raw data for executing the current process or application. For instance, if an image of the scene is transmitted across a computer network to another user, the computing environment 12 may transmit the raw data for processing by another computing environment.

The computing environment 12 may use the gestures library 192 to interpret movements of the skeletal model and to control an application based on the movements. The computing environment 12 can model and display a representation of a user, such as in the form of an avatar or a pointer on a display, such as in a display device 194. Display device 194 may include a computer monitor, a television screen, or any suitable display device. For example, a camera-controlled computer system may capture user image data and display user feedback on a television screen that maps to the user's gestures. The user feedback may be displayed as an avatar on the screen such as shown in FIG. 1. The avatar's motion can be controlled directly by mapping the avatar's movement to those of the user's movements. The user's gestures may be interpreted control certain aspects of the application.

As described above, it may be desirable to apply attributes of a temperament to a target's visual representation. For example, a user may wish to make the user's visual representation do a dance on the screen to indicate the user's happiness. The user may initiate the application of such attributes by performing a particular temperament identity gesture.

According to an example embodiment, the target may be a human target in any position such as standing or sitting, a human target with an object, two or more human targets, one or more appendages of one or more human targets or the like that may be scanned, tracked, modeled and/or evaluated to generate a virtual screen, compare the user to one or more stored profiles and/or to store profile information 198 about the target in a computing environment such as computing environment 12. The profile information 198 may be in the form of user profiles, personal profiles, application profiles, system profiles, or any other suitable method for storing data for later access. The profile information 198 may be accessible via an application or be available system-wide, for example. The profile information 198 may include lookup tables for loading specific user profile information. The virtual screen may interact with an application that may be executed by the computing environment 12 described above with respect to FIG. 1.

According to example embodiments, lookup tables may include user specific profile information. In one embodiment, the computing environment such as computing environment 12 may include stored profile data 198 about one or more users in lookup tables. The stored profile data 198 may include, among other things the targets scanned or estimated body size, skeletal models, body models, voice samples or passwords, the targets age, previous gestures, target limitations and standard usage by the target of the system, such as, for example a tendency to sit, left or right handedness, or a tendency to stand very near the capture device. This information may be used to determine if there is a match between a target in a capture scene and one or more user profiles 198 that, in one embodiment, may allow the system to adapt the virtual screen to the user, or to adapt other elements of the computing or gaming experience according to the profile 198.

One or more personal profiles 198 may be stored in computer environment 12 and used in a number of user sessions, or one or more personal profiles 198 may be created for a single session only. Users may have the option of establishing a profile where they may provide information to the system such as a voice or body scan, age, personal preferences, right or left handedness, an avatar, a name or the like. Personal profiles may also be provided for "guests" who do not provide any information to the system beyond stepping into the capture space. A temporary personal profile may be established for one or more guests. At the end of a guest session, the guest personal profile may be stored or deleted.

The gestures library 192, Gestures Recognition Engine 190, and profile 198 may be implemented in hardware, software or a combination of both. For example, the gestures library 192, and Gestures Recognition Engine 190 may be implemented as software that executes on a processor, such as processor 195, of the computing environment 12 (or on processing unit 101 of FIG. 3 or processing unit 259 of FIG. 4).

It is emphasized that the block diagram depicted in FIG. 2 and FIGS. 3-4 described below are exemplary and not intended to imply a specific implementation. Thus, the processor 195 or 32 in FIG. 1, the processing unit 101 of FIG. 3, and the processing unit 259 of FIG. 4, can be implemented as a single processor or multiple processors. Multiple processors can be distributed or centrally located. For example, the gestures library 192 may be implemented as software that executes on the processor 32 of the capture device or it may be implemented as software that executes on the processor 195 in the computing environment 12. Any combinations of processors that are suitable for performing the techniques disclosed herein are contemplated. Multiple processors can communicate wirelessly, via hard wire, or a combination thereof.

Furthermore, as used herein, a computing environment 12 may refer to a single computing device or to a computing system. The computing environment may include non-computing components. The computing environment may include a display device, such as display device 194 shown in FIG. 2. A display device may be an entity separate but coupled to the computing environment or the display device may be the computing device that processes and displays, for example. Thus, a computing system, computing device, computing environment, computer, processor, or other computing component may be used interchangeably.

The gestures library and filter parameters may be tuned for an application or a context of an application by a gesture tool. A context may be a cultural context, and it may be an environmental context. A cultural context refers to the culture of a user using a system. Different cultures may use similar gestures to impart markedly different meanings. For instance, an American user who wishes to tell another user to "look" or "use his eyes" may put his index finger on his head close to the distal side of his eye. However, to an Italian user, this gesture may be interpreted as a reference to the mafia.

Similarly, there may be different contexts among different environments of a single application. Take a first-user shooter game that involves operating a motor vehicle. While the user is on foot, making a fist with the fingers towards the ground and extending the fist in front and away from the body may represent a punching gesture. While the user is in the driving context, that same motion may represent a "gear shifting" gesture. With respect to modifications to the visual representation, different gestures may trigger different modifications depending on the environment. A different modification trigger gesture could be used for entry into an application-specific modification mode versus a system-wide modification mode. Each modification mode may be packaged with an independent set of gestures that correspond to the modification mode, entered into as a result of the modification trigger gesture. For example, in a bowling game, a swinging arm motion may be a gesture identified as swinging a bowling ball for release down a virtual bowling alley. However, in another application, the swinging arm motion may be a gesture identified as a request to lengthen the arm of the user's avatar displayed on the screen. There may also be one or more menu environments, where the user can save his game, select among his character's equipment or perform similar actions that do not comprise direct game-play. In that environment, this same gesture may have a third meaning, such as to select something or to advance to another screen.

Gestures may be grouped together into genre packages of complimentary gestures that are likely to be used by an application in that genre. Complimentary gestures—either complimentary as in those that are commonly used together, or complimentary as in a change in a parameter of one will change a parameter of another—may be grouped together into genre packages. These packages may be provided to an application, which may select at least one. The application may tune, or modify, the parameter of a gesture or gesture filter 191 to best fit the unique aspects of the application. When that parameter is tuned, a second, complimentary parameter (in the inter-dependent sense) of either the gesture or a second gesture is also tuned such that the parameters remain complimentary. Genre packages for video games may include genres such as first-user shooter, action, driving, and sports.

Figure 3:
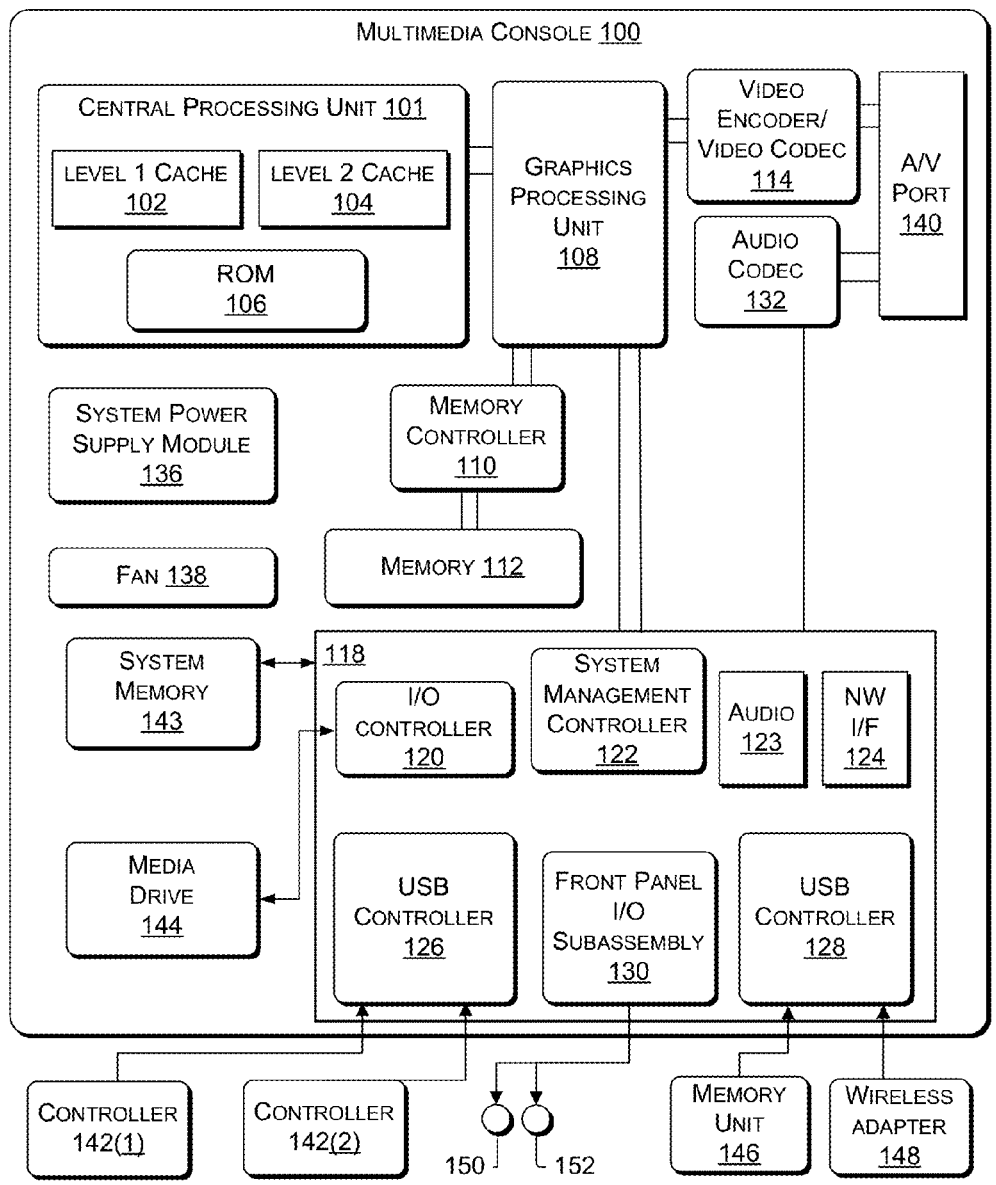
FIG. 3 illustrates an example embodiment of a computing environment in which the animation techniques described herein may be embodied.

FIG. 3 illustrates an example embodiment of a computing environment that may be used to interpret one or more gestures in target recognition, analysis, and tracking system. The computing environment such as the computing environment 12 described above with respect to FIGS. 1-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs.), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 4:
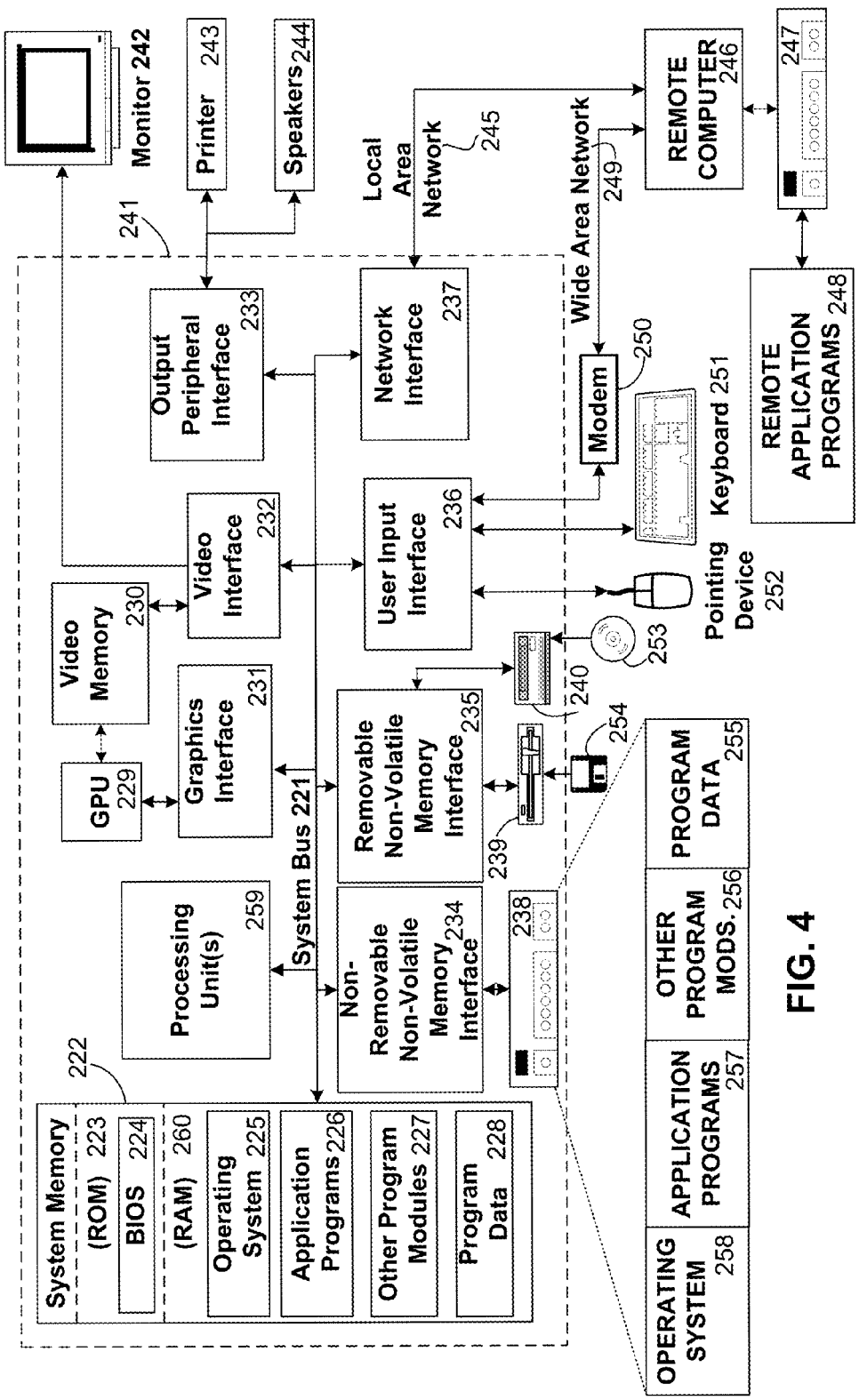
FIG. 4 illustrates another example embodiment of a computing environment in which the animation techniques described herein may be embodied.

FIG. 4 illustrates another example embodiment of a computing environment 220 that may be the computing environment 12 shown in FIGS. 1A-2 used to interpret one or more gestures in a target recognition, analysis, and tracking system. The computing system environment 220 is only one example of a suitable computing environment and is not intended to deduct any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228. Computer 241 may also comprise graphics interface 231, GPU 229 and video memory 230.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

The computer readable storage medium may comprise computer readable instructions for modifying a visual representation. The instructions may comprise instructions for rendering the visual representation, receiving data of a scene, wherein the data includes data representative of a user's temperament identity gesture in a physical space, and modifying the visual representation based on the user's temperament identity gesture, wherein the temperament identity gesture is a gesture that maps to a control for applying attributes indicative of a temperament to the user's visual representation.

Figure 5A:
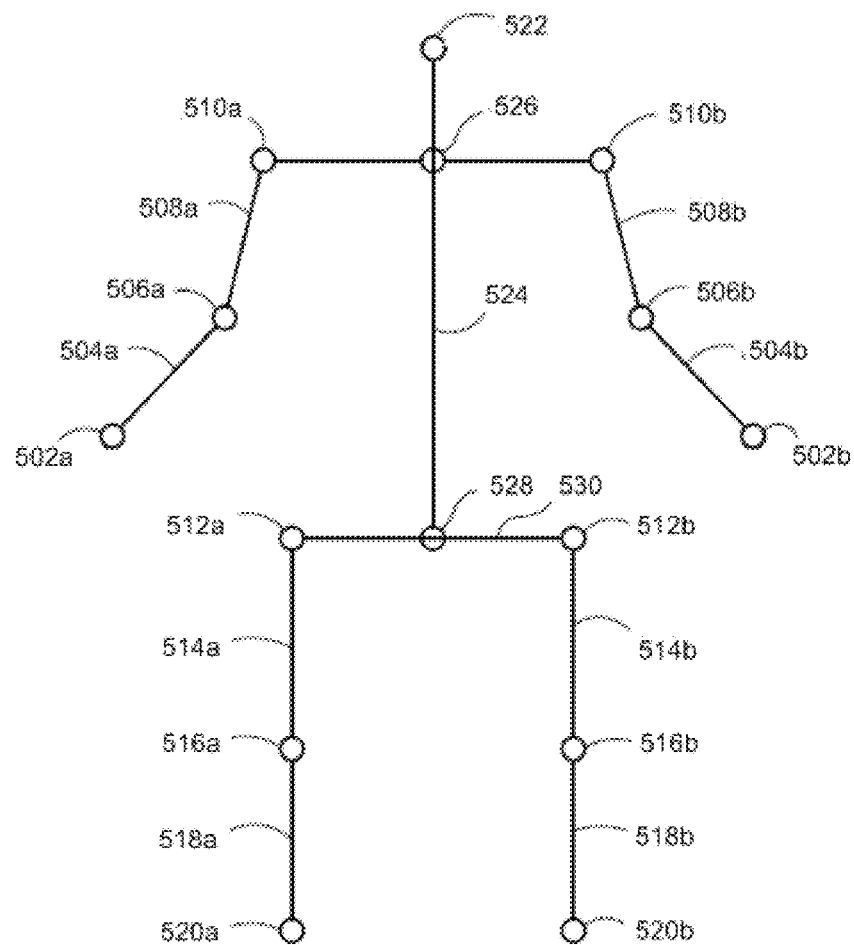
FIG. 5A illustrates a skeletal mapping of a user that has been generated from a depth image.

FIG. 5A depicts an example skeletal mapping of a user that may be generated from image data captured by the capture device 20. In this embodiment, a variety of joints and bones are identified: each hand 502, each forearm 504, each elbow 506, each bicep 508, each shoulder 510, each hip 512, each thigh 514, each knee 516, each foreleg 518, each foot 520, the head 522, the torso 524, the top 526 and bottom 528 of the spine, and the waist 530. Where more points are tracked, additional features may be identified, such as the bones and joints of the fingers or toes, or individual features of the face, such as the nose and eyes.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms 504 in front of his torso 524. A gesture may also incorporate props, such as by swinging a mock sword. A gesture may comprise more than one body part, such as clapping the hands 502 together, or a subtler motion, such as pursing one's lips.

A user's gestures may be used for input in a general computing context. For instance, various motions of the hands 502 or other body parts may correspond to common system wide tasks such as navigate up or down in a hierarchical list, open a file, close a file, and save a file. For instance, a user may hold his hand with the fingers pointing up and the palm facing the capture device 20. He may then close his fingers towards the palm to make a fist, and this could be a gesture that indicates that the focused window in a window-based user-interface computing environment should be closed. Gestures may also be used in a video-game-specific context, depending on the game. For instance, with a driving game, various motions of the hands 502 and feet 520 may correspond to steering a vehicle in a direction, shifting gears, accelerating, and braking. Thus, a gesture may indicate a wide variety of motions that map to a displayed user representation, and in a wide variety of applications, such as video games, text editors, word processing, data management, etc.

A user may generate a gesture that corresponds to walking or running, by walking or running in place in the physical space. For example, the user may alternately lift and drop each leg 512-520 to mimic walking without moving. The system may parse this gesture by analyzing each hip 512 and each thigh 514. A step may be recognized when one hip-thigh angle (as measured relative to a vertical line, wherein a standing leg has a hip-thigh angle of 0°, and a forward horizontally extended leg has a hip-thigh angle of 90°) exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

A gesture may be associated with a set of default parameters at first that the application may override with its own parameters. In this scenario, an application is not forced to provide parameters, but may instead use a set of default parameters that allow the gesture to be recognized in the absence of application-defined parameters. Information related to the gesture may be stored for purposes of pre-canned animation.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Wherein an application receiving this gesture information cannot accept false-positives as input, it may use only those recognized gestures that have a high confidence level, such as at least 95%. Where an application must recognize every instance of the gesture, even at the cost of false-positives, it may use gestures that have at least a much lower confidence level, such as that merely greater than 2%. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

Another exemplary gesture is a "heel lift jump." In this, a user may create the gesture by raising his heels off the ground, but keeping his toes planted. Alternatively, the user may jump into the air where his feet 520 leave the ground entirely. The system may parse the skeleton for this gesture by analyzing the angle relation of the shoulders 510, hips 512 and knees 516 to see if they are in a position of alignment equal to standing up straight. Then these points and upper 526 and lower 528 spine points may be monitored for any upward acceleration. A sufficient combination of acceleration may trigger a jump gesture. A sufficient combination of acceleration with a particular gesture may satisfy the parameters of a transition point.

Given this "heel lift jump" gesture, an application may set values for parameters associated with this gesture. The parameters may include the above acceleration threshold, which determines how fast some combination of the user's shoulders 510, hips 512 and knees 516 must move upward to trigger the gesture, as well as a maximum angle of alignment between the shoulders 510, hips 512 and knees 516 at which a jump may still be triggered. The outputs may comprise a confidence level, as well as the user's body angle at the time of the jump.

Setting parameters for a gesture based on the particulars of the application that will receive the gesture are important in accurately identifying gestures. Properly identifying gestures and the intent of a user greatly helps in creating a positive user experience.

An application may set values for parameters associated with various transition points to identify the points at which to use pre-canned animations. Transition points may be defined by various parameters, such as the identification of a particular gesture, a velocity, an angle of a target or object, or any combination thereof. If a transition point is defined at least in part by the identification of a particular gesture, then properly identifying gestures assists to increase the confidence level that the parameters of a transition point have been met.

Another parameter to a gesture may be a distance moved. Where a user's gestures control the actions of a visual representation in a virtual environment, that avatar may be arm's length from a ball. If the user wishes to interact with the ball and grab it, this may require the user to extend his arm 502-510 to full length while making the grab gesture. In this situation, a similar grab gesture where the user only partially extends his arm 502-510 may not achieve the result of interacting with the ball. Likewise, a parameter of a transition point could be the identification of the grab gesture, where if the user only partially extends his arm 502-510, thereby not achieving the result of interacting with the ball, the user's gesture also will not meet the parameters of the transition point.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 510*a*, and on the same side of the head 522 as the throwing arm 502*a*-510*a*. It may not be necessary to define all bounds of a volume, such as with this throwing gesture, where an outer bound away from the body is left undefined, and the volume extends out indefinitely, or to the edge of scene that is being monitored.

Figure 5B:
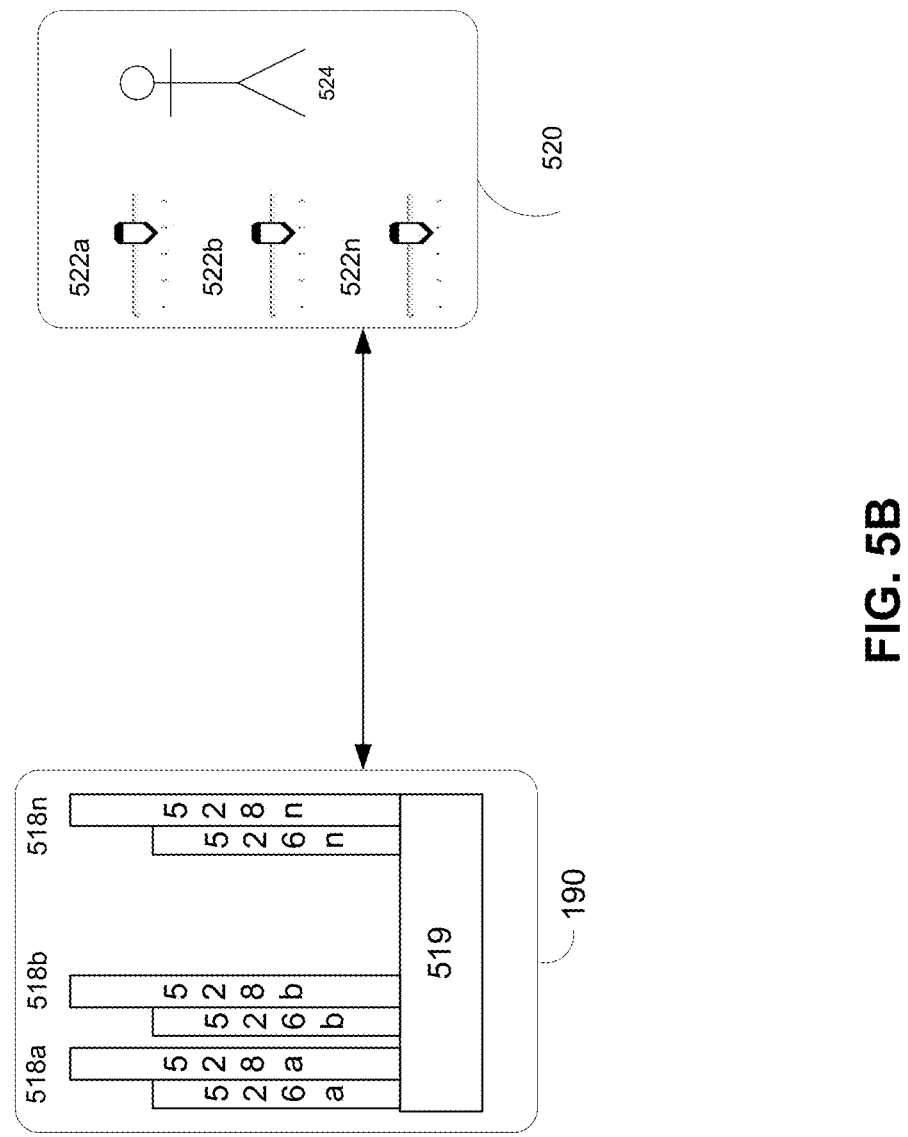
FIG. 5B illustrates further details of the gesture recognizer architecture shown in FIG. 2.

FIG. 5B provides further details of one exemplary embodiment of the gesture recognizer engine 190 of FIG. 2. As shown, the gesture recognizer engine 190 may comprise at least one filter 519 to determine a gesture or gestures. A filter 519 comprises information defining a gesture 526 (hereinafter referred to as a "gesture"), and may comprise at least one parameter 528, or metadata, for that gesture 526. For instance, a throw, which comprises motion of one of the hands from behind the rear of the body to past the front of the body, may be implemented as a gesture 526 comprising information representing the movement of one of the hands of the user from behind the rear of the body to past the front of the body, as that movement would be captured by the depth camera. Parameters 528 may then be set for that gesture 526. Where the gesture 526 is a throw, a parameter 528 may be a threshold velocity that the hand has to reach, a distance the hand must travel (either absolute, or relative to the size of the user as a whole), and a confidence rating by the gesture recognizer engine 190 that the gesture 526 occurred. These parameters 528 for the gesture 526 may vary between applications, between contexts of a single application, or within one context of one application over time.

Filters may be modular or interchangeable. In an embodiment, a filter has a number of inputs, each of those inputs having a type, and a number of outputs, each of those outputs having a type. In this situation, a first filter may be replaced with a second filter that has the same number and types of inputs and outputs as the first filter without altering any other aspect of the gesture recognizer engine 190 architecture. For instance, there may be a first filter for driving that takes as input skeletal data and outputs a confidence that the gesture 526 associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter 528. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

A context may be a cultural context, and it may be an environmental context. A cultural context refers to the culture of a user using a system. Different cultures may use similar gestures to impart markedly different meanings. For instance, an American user who wishes to tell another user to "look" or "use his eyes" may put his index finger on his head close to the distal side of his eye. However, to an Italian user, this gesture may be interpreted as a reference to the mafia.

Similarly, there may be different contexts among different environments of a single application. Take a first-person shooter game that involves operating a motor vehicle. While the user is on foot, making a fist with the fingers towards the ground and extending the fist in front and away from the body may represent a punching gesture. While the user is in the driving context, that same motion may represent a "gear shifting" gesture. There may also be one or more menu environments, where the user can save his game, select among his character's equipment or perform similar actions that do not comprise direct game-play. In that environment, this same gesture may have a third meaning, such as to select something or to advance to another screen.

The gesture recognizer engine 190 may have a base recognizer engine 517 that provides functionality to a gesture filter 519. In an embodiment, the functionality that the base recognizer engine 517 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 519 are loaded and implemented on top of the base recognizer engine 517 and can utilize services provided by the engine 517 to all filters 519. In an embodiment, the base recognizer engine 517 processes received data to determine whether it meets the requirements of any filter 519. Since these provided services, such as parsing the input, are provided once by the base recognizer engine 517 rather than by each filter 519, such a service need only be processed once in a period of time as opposed to once per filter 519 for that period, so the processing required to determine gestures is reduced.

An application may use the filters 519 provided by the gesture recognizer engine 190 or it may provide its own filter 519, which plugs in to the base recognizer engine 517. In an embodiment, all filters 519 have a common interface to enable this plug-in characteristic. Further, all filters 519 may utilize parameters 528, so a single gesture tool as described below may be used to debug and tune the entire filter system 519.

These parameters 528 may be tuned for an application or a context of an application by a gesture tool 521. In an embodiment, the gesture tool 521 comprises a plurality of sliders 523, each slider 523 corresponding to a parameter 528, as well as a pictorial representation of a body 524. As a parameter 528 is adjusted with a corresponding slider 523, the body 524 may demonstrate both actions that would be recognized as the gesture with those parameters 528 and actions that would not be recognized as the gesture with those parameters 528, identified as such. This visualization of the parameters 528 of gestures provides an effective means to both debug and fine tune a gesture.

FIG. 6 depicts a system 600 that may comprise a capture device 608, a computing device 610, and a display device 612. For example, the capture device 608, computing device 610, and display device 612 may each comprise any suitable device that performs the desired functionality, such as the devices described with respect to FIGS. 1-5B. It is contemplated that a single device may perform all of the functions in system 600, or any combination of suitable devices may perform the desired functions. For example, the computing device 610 may provide the functionality described with respect to the computing environment 12 shown in FIG. 2 or the computer in FIG. 3. As shown in FIG. 2, the computing environment 12 may include the display device and a processor. The computing device 610 may also comprise its own camera component or may be coupled to a device having a camera component, such as capture device 608.

In this example, a capture device 608 captures a scene in a physical space 601 in which a user 602 is present. The capture device 608 processes the depth information and/or provides the depth information to a computer, such as computing device 610. The depth information can be interpreted for display of a visual representation of the user 602. For example, the capture device 608 or, as shown, a computing device 610 to which it is coupled, may output to a display 612.

The visual representation of a user 602 in the physical space 601 can take any form, such as an animation, a character, an avatar, or the like. For example, the visual representation of the target, such as a user 602, may initially be a digital lump of clay that the user 602 can sculpt into desired shapes and sizes, or a character representation, such as the monkey 604 shown on display device 612. The visual representation may be a combination of the user's 602 features and an animation or stock model. The visual representation may be a stock model provided with the system 600 or application. For example, the user 602 may select from a variety of stock models that are provided by a game application. In a baseball game application, for example, the options for visually representing the user 602 may take any form, from a representation of a well-known baseball player to a piece of taffy or an elephant to a fanciful character or symbol, such as a cursor or hand symbol. The stock model may be modified with features of the user that are detected by the system. The visual representation may be specific to an application, such as packaged with a program, or the visual representation may be available across-applications or available system-wide.

The example visual representation shown in FIG. 6, as shown on the display device 612, is that of a monkey character 604. Though additional frames of image data may be captured and displayed, the frame depicted in FIG. 6 is selected for exemplary purposes. The rate that frames of image data are captured and displayed may determine the level of continuity of the displayed motion of the visual representation. It is also noted that an alternate or additional visual representation may correspond to another target in the physical space 601, such as another user or a non-human object, or the visual representation may be a partial or entirely virtual object.

The system 600 may capture information about the physical space 601, such as depth information, image information, RGB data, etc. According to one embodiment, image data may include a depth image or an image from a capture device 608 and/or RGB camera, or an image on any other detector. For example, capture device 608 may process the image data and use it to determine the shape, colors, and size of a target. Each target or object that matches the human pattern may be scanned to generate a model such as a skeletal model, a flood model, a mesh human model, or the like associated therewith. For example, as described above, the depth information may be used to generate a skeletal model of the user, such as that shown in FIG. 5A, where the system identifies the user's body parts such as the head and limbs. Using, for example, the depth values in a plurality of observed pixels that are associated with a human target and the extent of one or more aspects of the human target such as the height, the width of the head, or the width of the shoulders, or the like, the size of the human target may be determined.

The system 600 can track the movements of the user's 602 limbs by analyzing the captured data and translating it to the skeletal model. The system 600 can then track the skeletal model and map the movement of each body part to a respective portion of the visual representation. For example, if the user 602 waves his or her arm, the system may capture this motion and apply it to the virtual monkey's 604 arm such that the virtual monkey also waves its arm. Further, the system 600 may identify a gesture from the user's motion by evaluating the user's position in a single frame of capture data or over a series of frames and apply the gesture to the visual representation.

The system can use captured data, such as scanned data, image data or depth information to detect characteristics. The detectable characteristics may include any characteristics related to the user or the physical space that are detectable by the system 600. For example, detectable characteristics may include target characteristics (e.g., a user's facial features, hair color, voice analysis, etc), gestures (i.e., gestures performed by the user and recognized by the system 600), history data (data such as user tendency data that is detected by the system and can be stored), application status (e.g., failure/success in a game application), or any other characteristic detectable by the system that may be indicative of a user's temperament or can be used to deduct a user's temperament.

The system may analyze one or more detectable characteristics to deduce a user's temperament. The deduction may be based on inference or assumption or it may be based on scientific methods, such as the results of a study of temperaments and correlating characteristics. Thus, the deduction may be based on a simple analysis of typical characteristics that indicate a particular temperament, the identity of a gesture that indicates a specific temperament, a comparison of the detectable features to an in-depth analysis of psychology and the characteristics that correlate to various temperaments, or the like.

Target characteristics may include information that may be associated with the particular user 602 such as behaviors, speech patterns, facial expressions, skeletal movements, words spoken, history data, voice recognition information, or the like. Target characteristics may comprise any features of the target, such as: eye size, type, and color; hair length, type, and color; skin color; clothing and clothing colors. For example, colors may be identified based on a corresponding RGB image. Other target characteristics for a human target may include, for example, height and/or arm length and may be obtained based on, for example, a body scan, a skeletal model, the extent of a user 602 on a pixel area or any other suitable process or data. The computer 610 may use body recognition techniques to interpret the image data and may size and shape the visual representation of the user 602 according to the size, shape and depth of the user's 602 appendages.

As described, the system 600 may identify data from the physical space that includes an indication of the user's 602 temperament. For example, the system 600 may gather information related to the user's 602 motions, facial expressions, body language, emotions, etc, in the physical space. The system may use body posture recognition techniques to assist in the identity of the emotions or temperament of the user 602. For example, the system 600 may analyze and track a skeletal model of the user to determine how the user moves. The system 600 may track the user's 602 body and the motions made by the user's 602 body, including gestures that control aspects of the system, such as the application, operating system, or the like. The system 600 may identify the user's 602 body posture, facial expressions, vocal expressions and tone, directed gazes, etc. The user's 602 vocal expressions may provide an indication of the user's temperament. For example, the language used, the tone of voice, the pitch, volume, and the like may convey a sense of the user's temperament. For example, a harsh tone may be interpreted as anger or aggression. Other tones may be tense, modal, breathy, whispery, creaky, calm, excited, happy, or any other tone. Thus, the user's 602 characteristics are good indicators of the user's 602 temperament.

The system may apply at least one of the detected target characteristics of the user, as captured by the system 600, to the visual representation of the user 602. For example, the system may detect that the user 602 is wearing glasses and has a red shirt on and system 600 may apply glasses and a red shirt to the virtual monkey 604 which, in this example, is the visual representation of the user 602. The system may identify the user's facial movements, such as the movement of the user's eyebrows and/or a frowning or smiling expression. The system may detect words said by the user and the user's tone of voice, or the user's body position, etc. For example, the system may detect the right arm of a person and have the fidelity to distinguish the upper arm, lower arm, fingers, the thumb, joints in the fingers, etc. The system may be able to identify a color of the user's shirt that corresponds to the user's upper and lower arms and apply the color appropriately to the visual representation. The system may be able to identify a ring on a finger or a tattoo on the user's hand, and based on the model of the user generated by the system, apply the detected target characteristics to the visual representation to mimic the user's features in the physical space. The visual representation may look like the user, move like the user, have clothes on that resemble those of the user, etc.

Certain target characteristics detected by the system and used to deduce the user's temperament may not be directly applied to the user, but modified for display purposes. The user's characteristics may be modified to correspond to the form of the visual representation, the application, the status of the application, etc. Certain characteristics may not map directly to the visual representation of the user where the visual representation is a fanciful character. For example, the character representation of the user, such as the monkey 604 shown on display device 612, may be given body proportions, for example, that are similar to the user 602, but modified for the particular character. The monkey representation 604 may be given a height that is similar to the user 602, but the monkey's arms may be proportionately longer than the user's arms. The movement of the monkey's 604 arms may correspond to the movement of the user's 602 arms, as identified by the system, but the system may modify the animation of the monkey's arms to reflect the way a monkey's arms would move.

In the example shown in FIG. 6, the user 602 is sitting with a head tilted to the side, a right elbow resting on the knee, and the head being supported by the user's right hand. The user's facial expressions, body position, words spoken, or any other detectable characteristic may be applied to the virtual monkey 604, and modified if appropriate. For example, the user is frowning in the physical space. The system detects this facial expression and applies a frown to the monkey such that the virtual monkey is also frowning. Further, the monkey is seated in a position similar to the user, except modified to correspond to a monkey's body type and size in that position. Similarly, the system may use the user's target characteristics to deduct the user's temperament, but then apply attributes to the user's visual representation that are indicative of the temperament but that may or may not map directly to the user's characteristics.

The system 600 may compare the detected target characteristics with a library of possible temperaments and determine what attributes should be applied to the user's visual representation. For example, as described further below with respect to FIGS. 7 and 8, the computer 610 may store lookup tables with a compilation of temperament information. The lookup tables may include specific or general temperament information. The detected characteristics may be compared to the lookup tables to deduce the temperament of the user. The analysis may include a comparison of the detected body position, facial expressions, vocal tone and words, gestures, history data, or the like.

Figure 7:
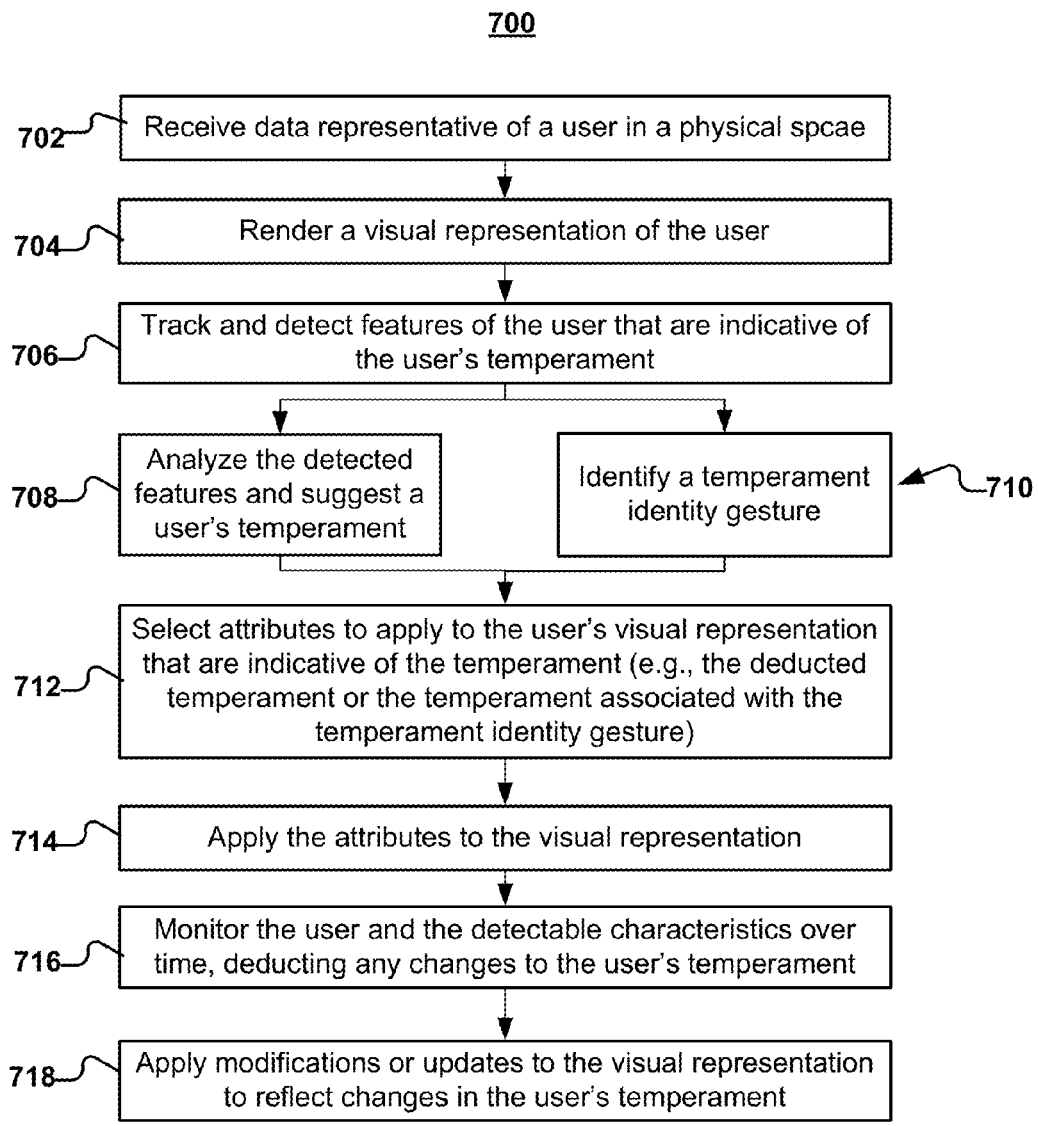
FIG. 7 depicts an example flow diagram for a method of applying attributes indicative of a user's temperament to a visual representation.

FIG. 7 shows an example method of deducting a user's temperament and selecting attributes indicative of the temperament for a display of the visual representation that corresponds to the temperament. For example, at 702, the system receives data from a physical space that includes a user. As described above, a capture device can capture data of a scene, such as the depth image of the scene and scan targets in the scene. The capture device may determine whether one or more targets in the scene correspond to a human target such as a user. Each target or object that matches the human body model may then be scanned to generate a skeletal model associated therewith. The skeletal model may then be provided to the computing environment for tracking the skeletal model and rendering a visual representation associated with the skeletal model.

At 704, the system may render a visual representation of the user. The visual representation may be based on the model, for example. The visual representation of a target in the physical space 601 can take any form, such as an animation, a character, an avatar, or the like. The visual representation may initially be a digital lump of clay that the user 602 can sculpt into desired shapes and sizes, or a character representation, such as the monkey 604. The visual representation may be directly modeled based on the features of the user detected by the capture device or it may be a fanciful character having select features of the user. The visual representation may be a combination of the user's 602 features and an animation or stock model.

The system may track the user and detect features of the user that are indicative of the user's temperament at 706. For example, the system may track a user's facial expressions and body movements to identify a temperament and then apply that temperament such that the avatar reflects the user's emotions. The system may use any detectable features to evaluate the user's temperament for application to the visual representation. The system may analyze the detected features at 708, and deduct a user's temperament. For example, a processor in the system may store lookup tables or databases with temperament information. The detected features of the user may be compared to the features in the database or lookup table that are indicative of various temperaments. For example, the lookup table may define the features that are indicative of a "sad" temperament. Such features may be a frown, tears, a low and quiet vocal tone, and arms folded across the chest. If any or all of these features of a user in the physical space are detected, the processor may deduct that the user is exhibiting a "sad" temperament.

The lookup tables or database, for example, may apply an application or may be system-wide. For example, a game application may define the features that indicate the various temperaments applicable to the game. The temperaments defined may include specific and general temperaments and may identify the temperaments comparing one or more inputs (i.e., detected features) to the features that define each temperament. It is also noted that references to a lookup table or database are exemplary, and it is contemplated that temperament information related to the techniques disclosed herein may be accessed, stored, packaged, provided, generated, or the like, in any manner suitable.

Alternately or in combination, the system may identify a temperament request gesture from the data captured with respect to the user at 710. For example, the user may perform a gesture that requests that a particular gesture be applied to the user's visual representation.

At 712, the system may select attributes to apply to the user's visual representation that reflect the temperament deducted or identified from the user's gesture. The attributes applicable to a particular temperament may be in lookup tables or a database as well. The attributes selected may be the features of the user detected by the capture device and/or the attributes selected may be animations that reflect the temperament. For example, if the system deducts that the user exhibits features indicative of a "sad" temperament, the lookup tables may indicate various animations that would reflect such temperament. The system may select any of these attributes and apply them to the user's visual representation.

The application of the attributes to the visual representation at 714 may occur in real time. Thus, the data captured with regards to the user's mood or emotions, along with body recognition analysis, etc, may be performed in real time and applied to the user's visual representation in real time. The user can therefore see a real time display of the user's emotions or temperament.

The system may continue to track the user and any motion in the physical space over time at 716 and apply modifications or updates to the visual representation at 718 to reflect changes in temperament. For example, the updates may be based on the changes in the user's detected features and history data. At any time, the capture device may identify behaviors and mannerisms, emotions, speech patterns, or the like, of a user to determine the user's temperaments and apply these to the user's visual representation. The updates may be applied to the visual representation in real time. For example, it may be desirable that the system captures a user's expressions and mimics over time to reflect the user's temperament via the visual representation.

FIG. 8 depicts an example of a lookup table 800 that may be used to deduce the temperament of the user. The example temperament lookup table 800 shown in FIG. 8 includes categories of detectable characteristics, such as a facial expression 802, vocal tone 804, vocal volume 806, words 808, body position 810, gesture 812, application results 814, and history data 816. The detected features or characteristics may include any feature in the physical space for which the system can capture information via the capture device, including detectable target characteristics, application status, etc. The categories in the lookup table 800 are exemplary, as any number and type of categories may be part of the user's temperament analysis. For example, the categories may further include a detected interaction with other users or objects, an analysis of the type of clothing the user is wearing, other items on the user's body, etc. It is contemplated that any detectable feature or characteristic of the user that may be captured by the system 600 in some manner that can be used in part of the analysis of the user's attitude or temperament may be applicable.

Three examples of detected characteristics are shown in the chart 800 for three users, where each of rows A, B, and C represent the detected characteristics. The first portion of the table 850 represents the detectable characteristics of the target captured in the scene. The second portion of the table 860 represents other detectable characteristics, such as the identification of a gesture being performed by the user, the status of the application and the results of such, and/or the history data specific to the user or the application. The last portion of the table 870 represents the system's deduction of the user's temperament as a result of an analysis of the available detectable features. As stated, the categories in table 800 are for exemplary purposes only and may be more or less inclusive of additional detectable characteristics.

Row A represents an example embodiment of the characteristics detected by the system. In row A, the system detects that a first user has a facial expression including a frown, the results in the application is a failure, and history data for the first user shows a tendency for the user to frown after failed results. An analysis of the system of these detected features may indicate that the temperament of the first user is "generally negative." Possibly additional detectable features would provide a more specific temperament, but with the data available, the system deducts the more general, generally negative temperament.

With respect to the second user, with the detectable characteristics set forth in row B, the system detects a frowning facial expression, a terse vocal tone, with quiet volume, no words, but the user's body position comprises a leaning back position, the head dropped to one side and supported by one hand. The system may determine from these features that the user's temperament is generally negative or possibly bored, tired, angry, sad, etc. The system may further detect, with respect to the second user, that it is a different user's turn to play in the game application, that the different user's turn has lasted for a long time, and detect, from an analysis of the user's history data, the temperament tendencies of this user under these circumstances. With that data, the system may determine that the second user's temperament is not only generally negative, but specifically bored or disinterested. For example, the system may identify the tendency of the second user, when the second user is not the active player in the game application, to have facial expressions, tones, body positions, etc, that correspond to a "bored" temperament.

It is contemplated that, for example, a frowning facial expression could correspond to many temperaments. The example temperaments and features that indicate each of the particular temperaments shown in Table 800 are exemplary only. Each detectable characteristic may be used to narrow down the temperament to a more specific attitude or mood, or the system may simply identify a general attitude, such as generally negative or positive.

The detectable characteristics of the third user, shown in Row C, include a smiling facial expression, a happy tone that is also loud, the words "Yeah" and "Awesome," and a body position that includes arms raised and jumping up and down. The jumping up and down motion may also be indicative of a gesture applicable to the application that results in a successful game result for the third user. The comparison of these detectable characteristics to the user's history data may also provide an indication of the likely temperament of the third user based on this information. In this example, the system deducts that the user's temperament, based on the detectable characteristics, is that of "excited."

The system may simply map the user's actual characteristics to the visual representation. In the example embodiment where the visual representation maps directly to the user's detected features, the user's temperament is inherently demonstrated by the visual representation as the visual representation reflects the user's detected features. However, the visual representation may not always be a direct representation of the user, and so the system may modify the temperament to correspond to the form of the visual representation. Upon a deduction of the user's temperament, the system may determine appropriate animations to apply to the visual representation of the user to reflect that temperament.

For example, FIG. 6 depicted the application of the user's facial expressions, body position, etc, to the visual representation 604 of the user, modified to represent the corresponding features of the monkey character. The monkey is frowning, but the monkey's mouth may not be a direct mapping of the user's mouth but rather, the system may apply the detected frown to the virtual monkey's mouth the way it would appear if a monkey were to frown. The translation of the user's temperament to the user's visual representation may take many forms and may comprise any number of animations. For example, if the visual representation of a user is a "house," the house may not be animated with facial features. Thus, the system may map the temperament to the house by translating the user's temperament to a new form. For example, if the system detects that the user has a "sad" temperament, detected based on the user's facial expressions or body position, the system may translate this to the house by displaying virtual windows of the virtual house to sag, and animating the house such that it appears to puff up and then let air out the front door, giving the appearance that the house has sighed.

A system can deduct a temperament that may be a mood or attitude of the user based on the detectable characteristics. A temperament can include any representation of a user's emotional response that expresses the user's feelings or thoughts. A temperament identified may be generally positive or negative, or it may be ambivalent. The attitude identified may be more specific, such as happy, angry, frustrated, bored, sad, etc. The specificity of the attitude may depend on the library of attitudes/emotions/moods, and the system 600 may identify a range of attitudes of the user, from general to specific. For example, the system may determine from the detectable features of the user's upright body position and upbeat vocal tone that the user generally has a positive attitude. Alternately, the system may determine, more specifically, that the user is excited because the upright body position includes jumping up and down, raised arms, and history data of the user indicates that these detectable characteristics indicate an excited temperament.

Different applications may have a vaster database of both general and specific moods and temperaments, and other applications may deduct general temperaments, such as generally positive or generally negative.

The greater number of detectable features may increase the fidelity of the system's analysis of the user's attitude. Changes in a user's body posture may be strong indicators of a user's temperament. A user's posture may include the position of the user's body, the way the user stands, sits, holds his or her chest, and where the user places his arms, legs, and feet. For example, if a user is leaning back with his or her head dropped to one side, where the head is supported by the user's hand, the system may identify the user's temperament to be bored or disinterested. Or, for example, if a user is sitting upright with the head erect and arms folded across the chest, with a pursed lips expression, the system may identify the user's temperament as one of disagreement, defensive, or frustrated. In general, a negative connotation may be reflected in the user's avatar. The system may detect a change in the user's body posture as a result of the user's tightening of the muscles in the neck or shoulders. Sometimes a user's slouch is simply an indication that a user is relaxing or maybe has bad posture. The position of a user's head may be an indication of a user's temperament. The system may detect a user's tensing of the jaw or furrowing o the brow.

Figure 9:
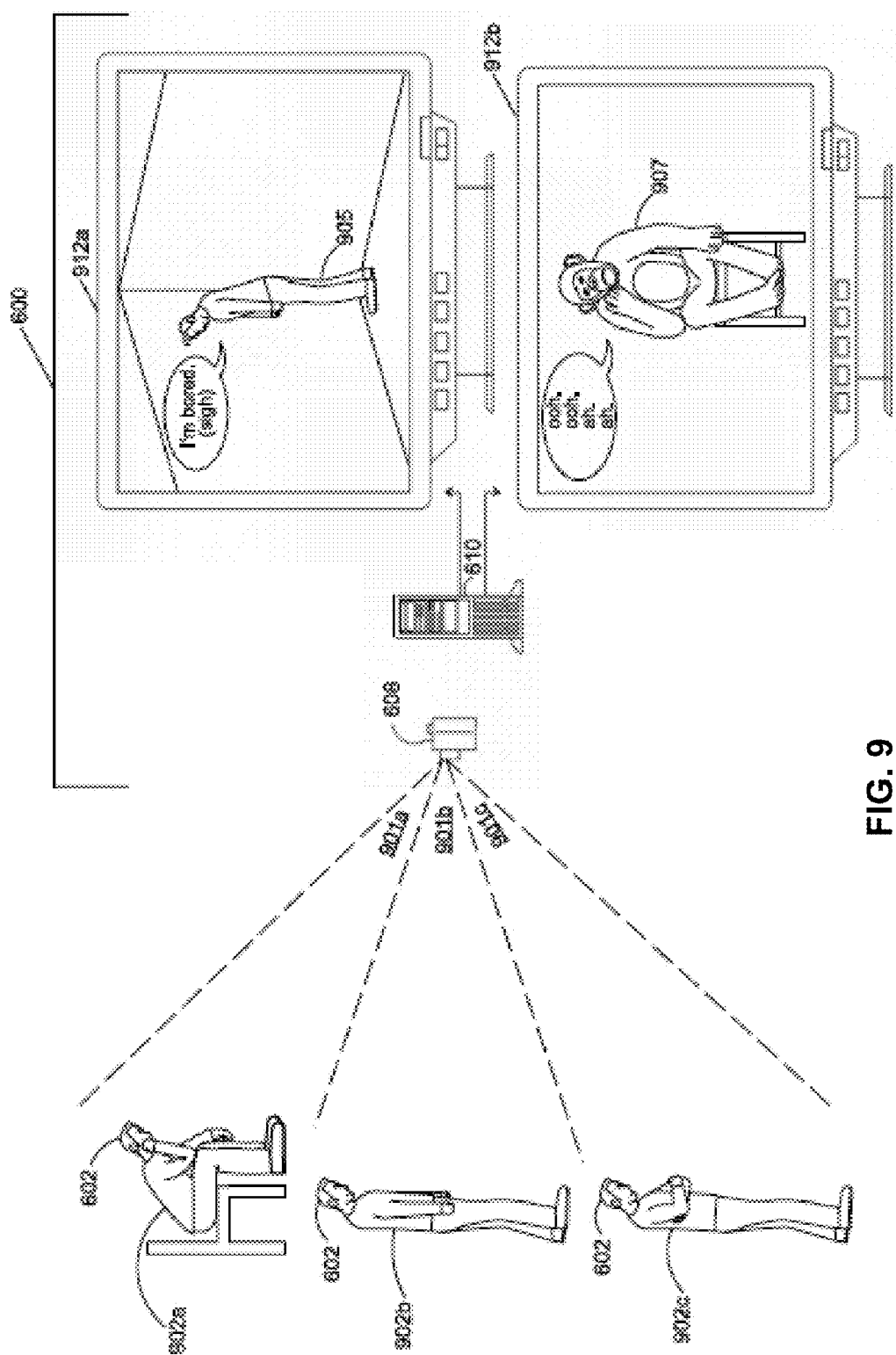
FIG. 9 depicts another example target recognition, analysis, and tracking system and example embodiments of the user in the physical space and example embodiments of the display of the user's visual representation.

FIG. 9 depicts the system 600 shown in FIG. 6, where the system tracks a user's detectable features and deducts a temperament. The temperament may be reflected in the user's visual representation by mapping the user's detectable features to the visual representation. The temperament may also be reflected by an application of animations that correspond to a particular temperament to the user's visual representation. FIG. 9 depicts the user 602 at three points in time in the physical space 601, where 901a, 901b, and 901c represent the physical space at the three discrete points in time. At each point in time, the user 602 may have shifted, changed facial expressions, performed a different motion and/or moved body position. The system 600 may capture the target, user 602, in the physical space 601, at each point and capture the user's detectable features at each point, shown in 902a, 902b, and 902c. Two examples of the resulting display of a visual representation of the user 602 are shown on example display 912a and example display 912b.

As discussed above, a visual representation of a user may be any animation, character, avatar, or the like. The example visual representations shown in FIG. 9 are an avatar 905 (shown on display device 912a) or a character 907 (shown on display device 912b). The avatar 905, for example, may be a close representation of the user in the physical space, mapping to the user's body position, hair coloring, clothes, etc. A character 907, for example, may be a character representation, such as the monkey shown. The character 907 may also have characteristics of the user as captured by the system 600. For example, facial expressions, clothes, etc, may be mapped to the character representation.

The system 600 may identify data from the physical space that includes an indication of the user's temperament. The system 600 may apply the user's temperament to the visual representation by applying attributes indicative of the temperament to the user's visual representation. Further, the system 600 may identify a gesture from the user's motion by evaluating the user's position in a single frame of capture data or over a series of frames. The system 600 may use a combination of information from each frame of data, from the changes in captured data between frames of data and over time, the gestures identified from the captured data, and any other available information, such as voice data, to identify a user's temperament or emotion.

In an example embodiment, the avatar 905 may be given characteristics that are determined from the analysis of the image data. The user 602 may opt for a visual representation that is mapped to the features of the user 602, where the user's 602 own characteristics, physical or otherwise, are represented by the visual representation. The visual representation of the user 602, also called an avatar, such as avatar 905, may be initialized based on the user's 602 features, such as body proportions, facial features, etc. For example, the skeletal model may be the base model for the generation of a visual representation of the user 602, modeled after the user's 602 proportions, length, weight of limbs, etc. Then, hair color, skin, clothing, and other detected characteristics of the user 602 may be mapped to the visual representation.

The mapping of the user's motion may not be a direct translation of the user's movement, as the visual representation may be adapted to the modification. For example, the visual representation of the user may be a fanciful character without facial features. The system may reflect a user's temperament in other ways that are applicable to the form of the visual representation. Thus, the user's motions may be translated for mapping to the visual representation with some added animation to reflect the form of the visual representation. For example, in FIG. 9, the visual representation of the user shown on display device 912b is that of a monkey character 907. Because the visual representation 907 of the user 602 is not a representation of the user's own physical structure, the user's 602 motion and/or temperament may be translated to be consistent with the form that the visual representation 907 takes. In this example, for example, the detected features and/or temperament may be translated to be consistent with the features of a monkey 907.

The user's characteristics that may also be indicative of the user's temperament may be mapped to the visual representation based on the system's analysis of detectable characteristics, thereby mimicking the user's appearance and/or movement in the physical space. In this example, the system tracks the user's detectable characteristics in the physical space at three points in time, 901a, 901b, and 901c. The user may detect that the user in position 902a is seated with the head leaning to one side and supported by a hand. The user 902a may be frowning and may be making sounds or saying words that are indicative of a bored or frustrated temperament. Thus, the system may analyze the detectable characteristics throughout time, and deduce the user's temperament.

In this example, the system deduces a "bored" temperament of the user. The system may deduct the user's temperament from the data captured from the physical space at point 901a. The system may continue to track the user's detectable features and the physical space at 901b and 901c represent examples of the user at different points in time. The system may apply attributes indicative of the deduced temperament based on a single frame of captured data, such as the captured data from the scene in the physical space 901a, or over time as a result of multiple frames of captured data, such as captured data from all three scenes 901a, 901b, 901c. The system may apply attributes indicative of the temperament deduced based on a single frame and/or over time. The confidence in the temperament deduced may increase based on a continued analysis of the user's detectable characteristics. Alternately, the system may detect or deduct a different temperament based on changes in the detectable characteristics.

The system, in real time, may display the detected characteristics by applying them to the user's visual representation. Thus, as shown in FIG. 6, the visual representation 604 depicts a number of the user's detected characteristics (e.g., facial expression, body position, etc). Similarly, the system may use the user's target characteristics to deduct the user's temperament, but then apply attributes to the user's visual representation that are indicative of the temperament but that may or may not map directly to the user's characteristics. For example, the system may deduce, from the detected characteristics, that the user likely has a temperament of "excited and happy." The detected characteristics that indicate this temperament may be characteristics such as a jumping up and down motion, yelling excitedly, a successful activity in a gaming application, and a smile. The system may compare these characteristics to a database, with characteristics that indicate various temperaments, for example, to deduce the user's temperament. The system may apply the target's characteristics directly to the visual representation as these characteristics may be good examples of attributes that are indicative of the temperament. However, the system may alternately, or additionally, apply attributes that are indicative of the temperament, regardless of whether or not the applied attributes are a direct mapping of the user's characteristics. For example, if the system deduces a "happy and excited" temperament from the user's detectable features, the system may animate the user's visual representation to do a dance on-screen or to animate the user jumping up into the sky and grabbing a star. The system could apply other attributes indicative of the temperament, such as flashing words on the display device (e.g., "I am really happy," or something humorous or silly).

In FIG. 9, the example animation of the avatar 905, that has a number of the user's detectable characteristics, is of the avatar 905 standing with a head against a wall saying, "I'm bored." The user 602 is not performing this action and may not be saying these words at any point as captured by the system, but the system may apply these attributes to the user because they are indicative of a "bored" temperament. Similarly, display device 912b shows an example display of the visual representation, where the monkey character 907 is shown dragging its arms and very slowly making a monkey sound, "Ooh. Ooh. Ah. Ah." The attributes applied to the monkey are indicative of a bored temperament. The attributes may be identified by the system based on lookup tables, for example, and may be specific to the character, such as the monkey, or the attributes could be generally applicable to many types visual representations.

The avatar 905 and monkey representation 907 are two different example visual representations that could be displayed, and are shown on example display devices 912a and 912b. Each visual representation 905, 907 and application of attributes indicative of the user's 602 temperament may be based on a single set of captured data, such as that captured with respect to the physical space at time 901a. Alternately, both example displays of each visual representation 905, 907 could be a result of the system monitoring the user 602 over time. The user may use the capture data over time to update the user's temperament, add more features to the visual representation, apply attributes that are indicative of a more specific temperament, or the like.

The user 602 may perform gestures that result in an application of attributes indicative of a particular temperament to the user's visual representation. A temperament identity gesture may be a gesture that is interpreted as a request to apply attributes indicative of a particular temperament to the visual representation of the user. For example, the system's detection of a user's "bored" temperament in FIG. 9 may be a result of the system's recognition of a user's gesture in the physical space that indicates a "bored" temperament. The gesture may comprise, for example, the user's body position in 902c, where the arms are folded across the chest. To differentiate the motion from a user's motion simply to stand this way, he gesture may comprise a dramatic hold of the arms into position, or a slow movement of the arms to be folded across the chest. A gesture recognition engine, such as the gesture recognition engine 190 described with respect to FIG. 5B, may compare the user's motion to the gesture filters that correspond to the gestures in a gesture library 190. The user's 602 captured motion may correspond to a temperament identity gesture 196 in the gestures library 190, for example. Thus, the application of such attributes to a visual representation may be an aspect of the operating system and/or application that can be controlled by or recognized from the user's gestures.

A temperament identity gesture may or may not comprise characteristics that are typically associated with a particular temperament. For example, a gesture for a "sad" temperament may be a hand movement, where the hand movement is not a characteristic that a person typically makes when having a "sad" temperament. However, the hand movement may be a gesture that the user can perform to direct the system to apply attributes indicative of a "sad" temperament to the visual representation. The user can therefore control the temperament of the user's visual representation by performing gestures in the physical space. A user may intentionally or unintentionally perform a gesture that corresponds to a temperament. For example, a gesture for a user's hands folded across his or her chest may be a gesture recognized as a temperament of frustration and the user may simply be conducting the motion that corresponds to the gesture because the user is feeling frustrated.

The system's recognition of a gesture that indicates the user is frustrated, along with a user's expression, such as a frown, may result in a visual representation that reflects a frustrated temperament. Alternately, the user may intentionally perform a gesture in the physical space to cause a particular temperament to be applied to the user's visual representation. For example, the user may have just won a game or did something successful in an application. A gesture for a "happy" temperament may comprise a user's jumping up and down with arms raised motion. The user may perform the "happy" temperament gesture causing the system to apply the target characteristics and/or any number of "happy" attributes to the user's visual representation. For example, as described above, the user's visual representation may do a cartwheel, or perform a dance, or any other activity that the system associates with an expression of the temperament of happiness. Thus, while the gestures in the virtual space may act as controls of an application such as an electronic game, they may also correspond to a request by the user for the system to reflect a particular temperament on the user's visual representation.

The system 600 may update the user's temperament in the visual representation of the user by monitoring the detectable characteristics. The system 600 may use a combination of information from each frame of data, such as that captured from the user at points 901a, 901b, 901c, from the changes in captured data between frames of data and over time, the gestures identified from the captured data, the target characteristics and changes in time of the target's characteristics, and any other available information, such as facial expressions, body posture, voice data, etc, to identify and update a temperament as it is reflected by the visual representation of the user.

The target characteristics associated with a user in the physical space may become part of a profile. The profile may be specific to a particular physical space or a user, for example. Avatar data, including features of the user, may become part of the user's profile. A profile may be accessed upon entry of a user into a capture scene. If a profile matches a user based on a password, selection by the user, body size, voice recognition or the like, then the profile may be used in the determination of the user's visual representation.

History data for a user may be monitored, storing information to the user's profile. For example, the system may detect features specific to the user, such as the user's behaviors, speech patterns, emotions, sounds, or the like. The system may apply those features to the user's visual representation when applying a temperament to the visual representation. For example, if the system identifies the user's temperament and selects an attribute that comprises speech to reflect the temperament, the visual representation's voice may be patterned from the user's speech patterns or may even be a recording of the user's own voice.

User specific information may also include tendencies in modes of play by one or more users. For example, if a user tends to behave or react in a certain manner, the system may track the user's tendencies to more accurately deduct the user's temperament. For example, if the system detects body positions of the user that are indicative of "angry" temperaments, and the user tends to behave in a similar manner each time the user fails in the application (such as a game), the system may track this information. Thus, the system can begin to track the user's tendencies and use that information to more accurately estimate the user's temperament.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Furthermore, while the present disclosure has been described in connection with the particular aspects, as illustrated in the various figures, it is understood that other similar aspects may be used or modifications and additions may be made to the described aspects for performing the same function of the present disclosure without deviating therefrom. The subject matter of the present disclosure includes all novel and non-obvious combinations and sub-combinations of the various processes, systems and configurations, and other features, functions, acts, and/or properties disclosed herein, as well as any and all equivalents thereof. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments.

In addition to the specific implementations explicitly set forth herein, other aspects and implementations will be apparent to those skilled in the art from consideration of the specification disclosed herein. Therefore, the present disclosure should not be limited to any single aspect, but rather construed in breadth and scope in accordance with the appended claims. For example, the various procedures described herein may be implemented with hardware or software, or a combination of both.

What is claimed:

1. A method for applying attributes indicative of a user's temperament to a visual representation of the user, the method comprising:
   rendering a visual representation of a user;
   receiving, at a computing system, first data indicative of the user in a physical space, the first data comprising image data indicating a user body gesture while playing an application game and audible data indicating utterances made by the user while playing the application game;
   analyzing, at the computing system, the first data indicative of the user in the physical space and data indicative of an application game result identifying success or failure of the user playing the application game to deduce an emotional temperament, the analyzing comprising querying a database to identify the emotional temperament based upon the user body gesture, the utterances made by the user, the application game result identifying success or failure of the user playing the application game, and past tendencies of the user's temperament;
   determining, at the computing system, a pre-existing animation to display based on the deduced emotional temperament, the pre-existing animation having a motion, pose or facial expression not performed by the user as indicated in the first data; and
   displaying, at the computing system, the pre-existing animation for the visual representation on a display device.

2. The method of claim 1, wherein the visual representation is at least one of an avatar, a character, a cursor, or a stock model.

3. The method of claim 1, wherein analyzing the first data of the user in the physical space comprises:
   analyzing a user's characteristics, a user's physical features, a user's behavior, a user's speech pattern, a user's voice, a gesture, or history data.

4. The method of claim 1, wherein the first data indicative of the user in the physical space is representative of at least one of a user's characteristics in the physical space.

5. The method of claim 1, further comprising:
   applying at least one of a user's characteristics to the visual representation.

6. The method of claim 1, wherein receiving first data indicative of the user in the physical space comprises:
   receiving data via a capture device.

7. The method of claim 1, wherein the deduced emotional temperament comprises generally negative, generally positive, ambivalent, bored, happy, sad, frustrated, excited, or angry.

8. The method of claim 1, further comprising:
   receiving a second data indicative of the user in the physical space;
   determining a change to the user's emotional temperament based on a difference between the second data and the first data;
   determining a second pre-existing animation based on the change to the user's emotional temperament, the second pre-existing animation having a motion, pose or facial expression not expressed in the second data; and
   displaying the second pre-existing animation for the visual representation on the display device.

9. The method of claim 1, further comprising:
   selecting the pre-existing animation from a plurality of pre-existing animations that correspond to the deduced emotional temperament.

10. A system for applying attributes indicative of a user's temperament to a visual representation, the system comprising:
    a processor; and
    memory communicatively coupled with the processor, the memory bearing processor-executable instructions that, upon execution on the processor, cause the system to at least:
    render a visual representation of a user;
    receive data indicative of the user in a physical space, the first data comprising image data indicating a user body gesture while playing an application game and audible data indicating utterances made by the user while playing the application game;
    analyze the data indicative of the user in the physical space and data indicative of an application game result identifying success or failure of the user playing the application game to deduce an emotional temperament, the analyzing comprising querying a database to identify the emotional temperament based upon the user body gesture, the utterances made by the user, the application game result identifying success or failure of the user playing the application game, and past tendencies of the user's temperament;
    determine a pre-existing animation to display based on the deduced emotional temperament, the pre-existing animation having a motion, pose or facial expression not performed by the user as indicated in the first data; and
    display the pre-existing animation for the visual representation on a display device.

11. The system of claim 10, further comprising processor-executable instructions that cause the system to at least:
    display the pre-existing animation for the visual representation on a display device in real time with respect to the receipt of data indicative of the user in the physical space.

12. The system of claim 11,
    the memory having stored thereon data correlating characteristics to a particular emotional temperament.

13. A computer-readable storage device that is not only a propagating signal comprising computer-executable instructions that, upon execution on a computer, cause the computer to perform operations comprising:
    rendering a visual representation of a user;
    receiving data indicative of the user in a physical space, the first data comprising image data indicating a user body gesture while playing an application game and audible data indicating utterances made by the user while playing the application game;
    analyzing the first data indicative of the user in the physical space and data indicative of an application game result identifying success or failure of the user playing the application game to deduce an emotional temperament, the analyzing comprising querying a database to identify the emotional temperament based upon the user body gesture, the utterances made by the user, the application game result identifying success or failure of the user playing the application game, and past tendencies of the user's temperament;

determining a pre-existing animation of to display based on the deduced emotional temperament, the pre-existing animation having a motion, pose or facial expression not performed by the user as indicated in the first data; and displaying the pre-existing animation for the visual representation on a display device.

14. The computer-readable storage device of claim 13, wherein displaying the pre-existing animation for the visual representation on a display device is performed in real time with respect to receiving data indicative of the user in the physical space.

15. The computer-readable storage device of claim 13, wherein the visual representation is at least one of an avatar, a character, a cursor, or a stock model.

16. The computer-readable storage device of claim 13, comprising instructions that, upon execution on the computer, cause the computer to perform further operations comprising:

applying at least one of a user's characteristics to the visual representation, the data comprising data representative of the user's characteristics.

17. The computer-readable storage device of claim 13, wherein receiving data indicative of the user in the physical space comprises:

receiving data via a capture device.

18. The computer-readable storage device of claim 13, wherein the deduced emotional temperament comprises at least one of generally negative, generally positive, ambivalent, bored, happy, sad, frustrated, excited, or angry.

19. The computer-readable storage device of claim 13, comprising instructions that, upon execution on the computer, cause the computer to perform further operations comprising:

providing a filter representing an emotional temperament identity gesture, the filter comprising base information about the emotional temperament identity gesture; and applying the filter to the first data and determining an output from the base information about the emotional temperament identity gesture.

20. The computer-readable storage device of claim 13, comprising instructions that, upon execution on the computer, cause the computer to perform further operations comprising:

selecting the pre-existing animation from a plurality of pre-existing animations that correspond to the deduced temperament.

* * * * *